US012568418B2

(12) United States Patent
Jia et al.

(10) Patent No.: US 12,568,418 B2
(45) Date of Patent: Mar. 3, 2026

(54) CALL SYSTEM, EXTENSION, AND HOST

(71) Applicant: HUAWEI TECHNOLOGIES CO., LTD., Shenzhen (CN)

(72) Inventors: Yinyuan Jia, Shanghai (CN); Weilin Gong, Shenzhen (CN); Zhifeng Wang, Shanghai (CN); Qi Yu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 349 days.

(21) Appl. No.: 18/552,251

(22) PCT Filed: Mar. 24, 2022

(86) PCT No.: PCT/CN2022/082745
§ 371 (c)(1),
(2) Date: Sep. 25, 2023

(87) PCT Pub. No.: WO2022/206550
PCT Pub. Date: Oct. 6, 2022

(65) Prior Publication Data
US 2024/0172067 A1     May 23, 2024

(30) Foreign Application Priority Data
Mar. 29, 2021    (CN) .......................... 202110336447.6

(51) Int. Cl.
*H04W 36/00*        (2009.01)
*H04W 36/30*        (2009.01)
(52) U.S. Cl.
CPC ... *H04W 36/304* (2023.05); *H04W 36/00838* (2023.05); *H04W 36/302* (2023.05)

(58) Field of Classification Search
CPC ......... H04W 36/304; H04W 36/00838; H04W 36/302; H04W 36/033; H04W 36/0085
(Continued)

(56) References Cited

U.S. PATENT DOCUMENTS 9,226,096 B2    12/2015  Moon
10,178,584 B2 *  1/2019  Lee ....................... H04W 76/23
(Continued)

FOREIGN PATENT DOCUMENTS

CN       100414946 C      8/2008
CN       100426822 C     10/2008
(Continued)

OTHER PUBLICATIONS

International Search Report and Written Opinion in International Appln. No. PCT/CN2022/082745, mailed on Jun. 22, 2022, 19 pages (with English translation).

*Primary Examiner* — Amancio Gonzalez
(74) *Attorney, Agent, or Firm* — Fish & Richardson P.C.

(57) ABSTRACT
Embodiments of this application relate to a call system, an extension, and a host in the field of communication technologies. An example call system includes a host and an extension. A network side device and the host are connected through a network side link, and the host and the extension are connected through a first terminal side link. The extension exchanges a call data packet with the network side device through the first terminal side link and the network side link. The extension and the host transmit the call data packet through a second terminal side link in response to determining that call quality of the extension is lower than a quality threshold. The first terminal side link is different from the second terminal side link.

20 Claims, 23 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 10,567,442 | B2 * | 2/2020 | Choe | H04L 65/1016 |
| 10,681,673 | B2 * | 6/2020 | Hong | H04W 76/28 |
| 10,772,018 | B2 * | 9/2020 | Yeh | H04W 36/08 |
| 10,966,135 | B2 * | 3/2021 | Svennebring | H04W 36/304 |
| 11,026,147 | B2 * | 6/2021 | Oyman | H04M 15/66 |
| 11,291,059 | B2 * | 3/2022 | Zhang | H04W 72/0466 |
| 11,576,095 | B2 * | 2/2023 | Peisa | H04W 36/0061 |
| 11,792,797 | B2 * | 10/2023 | Wang | H04W 28/26 |
| | | | | 370/336 |
| 11,889,541 | B2 * | 1/2024 | Balasubramanian | |
| | | | | H04W 72/541 |
| 11,902,950 | B2 * | 2/2024 | Xue | H04W 72/02 |
| 12,010,569 | B2 * | 6/2024 | Parichehrehteroujeni | |
| | | | | H04W 36/0072 |
| 12,185,349 | B2 * | 12/2024 | Ryu | H04W 72/1263 |
| 12,193,000 | B2 * | 1/2025 | Falkenberg | H04W 72/40 |
| 12,250,661 | B2 * | 3/2025 | Wang | H04L 27/2602 |
| 12,267,747 | B2 * | 4/2025 | Xu | H04W 72/23 |
| 12,295,035 | B2 * | 5/2025 | Sun | H04L 27/2602 |
| 2018/0213088 | A1 | 7/2018 | Choe et al. | |
| 2018/0332084 | A1 * | 11/2018 | Choe | H04M 3/543 |
| 2019/0253277 | A1 * | 8/2019 | Venkataraman | H04W 8/005 |
| 2019/0320361 | A1 | 10/2019 | Uchiyama et al. | |
| 2019/0342860 | A1 * | 11/2019 | Caretti | H04W 72/30 |
| 2020/0260353 | A1 * | 8/2020 | Xu | H04W 76/27 |
| 2021/0281800 | A1 * | 9/2021 | Singh | H04L 65/1016 |
| 2022/0322230 | A1 * | 10/2022 | Ye | H04L 1/1893 |
| 2022/0353732 | A1 * | 11/2022 | Filippou | H04W 28/0289 |
| 2023/0247528 | A1 * | 8/2023 | Liu | H04W 74/0808 |
| | | | | 370/329 |
| 2023/0269573 | A1 * | 8/2023 | Orsino | H04W 8/02 |
| | | | | 455/11.1 |
| 2024/0098764 | A1 * | 3/2024 | Ashraf | H04W 76/14 |
| 2024/0236775 | A9 * | 7/2024 | Wang | H04W 60/00 |

FOREIGN PATENT DOCUMENTS

| | | | |
|---|---|---|---|
| CN | 100571309 | C | 12/2009 |
| CN | 101742010 | A | 6/2010 |
| CN | 101998325 | A | 3/2011 |
| CN | 102761988 | A | 10/2012 |
| CN | 103139765 | A | 6/2013 |
| CN | 103152715 | A | 6/2013 |
| CN | 101998324 | B | 10/2014 |
| CN | 104464238 | A | 3/2015 |
| CN | 104994247 | A | 10/2015 |
| CN | 106416208 | A | 2/2017 |
| CN | 103905660 | B | 5/2017 |
| CN | 110191241 | A | 8/2019 |
| CN | 110719371 | A | 1/2020 |
| CN | 111165041 | A | 5/2020 |
| CN | 111818593 | A | 10/2020 |

* cited by examiner

CONT. FROM

S1001. A host receives an incoming call notification of a network side device

S1002. The host determines a human-computer interaction device in a device network S1003. The host controls the human-computer interaction device to perform incoming call reminding Mr. Wang
135xxxx2195

Mr. Wang
189xxxx
2195

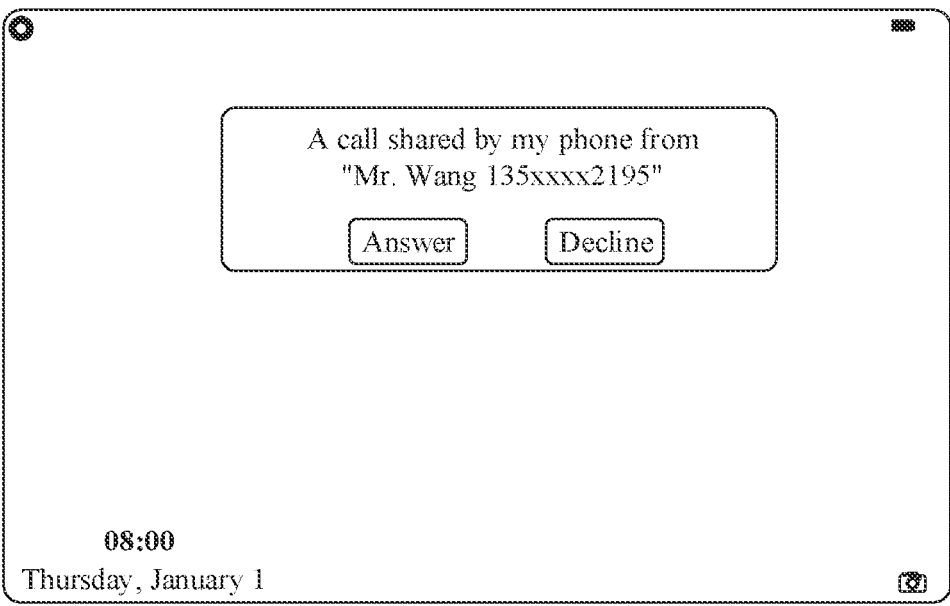

FIG. 15

```
                        ┌──────────┐
                        │   Host   │
                        └────┬─────┘
                             │ Downlink call data packet
            ┌────────────────┼────────────────┐
            ▼                ▼                 ▼
    ┌──────────────┐  ┌──────────────┐  ┌──────────────┐
    │ Extension 1  │  │ Extension 2  │  │ Extension 3  │
    └──────────────┘  └──────────────┘  └──────────────┘
```

FIG. 16a

```
    ┌──────────────┐              Downlink call data packet
    │ Host (sound  │──────────────────────────────────────┐
    │   mixing)    │                                       │
    └──────┬───────┘                                       │
           ▲  Uplink call data packet                      │
     ┌─────┴──────────────────┐                            │
     │            │           │                            │
 ┌───┴────────┐ ┌─┴──────────┐ ┌──────────┴─┐              │
 │ Extension 1│ │ Extension 2│ │ Extension 3│              │
 └───▲────────┘ └─▲──────────┘ └──────────▲─┘              │
     │            │                       │                │
     └────────────┴───────────────────────┴────────────────┘
```

FIG. 16b (a)                                    (b)

CALL SYSTEM, EXTENSION, AND HOST

CROSS-REFERENCE TO RELATED APPLICATIONS

This application is a National Stage of International Application No. PCT/CN2022/082745, filed on Mar. 24, 2022, which claims priority to Chinese Patent Application No. 202110336447.6, filed on Mar. 29, 2021, both of which are hereby incorporated by reference in their entireties.

TECHNICAL FIELD

This application relates to the field of communication technologies, and in particular, to a call system, an extension, and a host.

BACKGROUND

Currently, when a Bluetooth connection is established between a mobile phone and another electronic device (for example, a smart watch), after receiving an incoming call from a network side device, the mobile phone may notify the smart watch of the incoming call, and a user answers the call on the smart watch.

After the user answers the incoming call of the mobile phone by using the smart watch, the mobile phone forwards, to the smart watch for playing, a downlink call data packet sent by the network side device, and sends, to the network side device, an uplink call data packet collected by the smart watch. In a call process, when the user carries the smart watch away from the mobile phone, quality of a Bluetooth link between the mobile phone and the smart watch gradually deteriorates, and a packet loss rate, jitter, and a latency of the uplink and downlink call data packets increase. Consequently, call quality deteriorates or even the call is interrupted, and user experience is poor.

SUMMARY

This application provides a call system, an extension, and a host, to resolve a problem in a current technology that call quality is poor or even a call is interrupted in a process in which a user uses the extension to answer the call on a mobile phone.

To achieve the foregoing objective, the following technical solutions are used in this application.

According to a first aspect, an embodiment of this application provides a call system, including a host and an extension. A network side device and the host are connected through a network side link, the host and the extension are connected through a first terminal side link, and the extension exchanges a call data packet with the network side device through the first terminal side link and the network side link. The extension and the host transmit the call data packet through a second terminal side link when call quality of the extension is lower than a quality threshold. The first terminal side link is different from the second terminal side link, and there may be one or more second terminal side links.

According to the call system provided in this embodiment, in a process in which a user makes a call by using the extension through the first terminal side link, when the call quality of the extension is poor, the host and the extension may transmit the call data packet through the second terminal side link, to improve the call quality of the extension and improve user experience.

In some embodiments, the second terminal side link is a communication link pre-established by the host and the extension. By pre-establishing the communication link, when the call quality of the extension is lower than the quality threshold, the second terminal side link may be immediately used to transmit the call data packet, to quickly improve the call quality.

In some other embodiments, the second terminal side link is a communication link newly established by the host and the extension when the call quality of the extension is lower than the quality threshold. In a call process, a case in which the call quality of the extension is lower than the quality threshold may occur, or the case may not occur Therefore, in some call processes, the pre-established second terminal side link may be idle, resulting in a waste of resources of the host and the extension. However, in this embodiment, the second terminal side link is a communication link newly established by the host and the extension when the call quality of the extension is lower than the quality threshold. This reduces resource idleness and improves resource utilization of the host and the extension.

In some embodiments, that the extension and the host transmit the call data packet through a second terminal side link when call quality of the extension is lower than a quality threshold includes: The extension and the host jointly transmit the call data packet through the first terminal side link and the second terminal side link when the call quality of the extension is lower than the quality threshold. In this embodiment, the host and the extension jointly transmit the call data packet through the two links, so that a parameter such as a packet loss, jitter, or a latency in a data packet transmission process can be reduced, to improve the call quality.

In addition, the host and the extension may, further transmit the call data packet through only the second terminal side link, not through the first terminal side link having poor call quality.

In some embodiments, the first terminal side link or the second terminal side link is: a Bluetooth link, a wireless fidelity Wi-Fi link, or a data service link. The Wi-Fi link may be a Wi-Fi local area network link or a Wi-Fi P2P link. When the host has two SIM cards, the data service link may be a data service link established by the host and the extension by using a SIM card 1, or a data service link established by the host and the extension by using a SIM card 2.

In some embodiments, when the call quality of the extension is lower than the quality threshold, the extension further displays prompt information, where the prompt information is used to prompt a user to control the extension to approach the host. For example, in a scenario of a voice or video call, the prompt information may prompt a voice "beep ~" or "The signal of the extension is weak. Please approach the host." In the scenario of a video call, the prompt information may be text information: "The signal of the extension is weak. Please approach the host."

In some embodiments, the host or the extension detects first call quality of the first terminal side link and second call quality of the second terminal side link. The host or the extension disconnects the second terminal side link when the first call quality is higher than the quality threshold; or the host or the extension disconnects the first terminal side link when the second call quality is higher than the quality threshold.

Optionally, that the host or the extension disconnects the second terminal side link when the first call quality is higher than the quality threshold includes: The host or the extension disconnects the second terminal side link when the first call quality is higher than the quality threshold and higher than the second call quality.

Optionally, that the host or the extension disconnects the first terminal side link when the second call quality is higher than the quality threshold includes: The host or the extension disconnects the first terminal side link when the second call quality is higher than the quality threshold and higher than the first call quality.

According to the call system provided in this embodiment, the host and the extension may select a terminal side link having best call quality for communication, so that the host and the extension can be avoided from maintaining a plurality of terminal side links at the same time while the call quality of the extension is ensured, to save resource overheads of the host and the extension.

In some embodiments, when the call quality of the extension is lower than the quality threshold, the extension lowers a coding standard of an uplink audio and/or video in the call data packet: and/or the host lowers a coding standard of a downlink audio and/or video in the call data packet; and/or the host sends a coding standard change request to the network side device, to request the network side device to lower a coding standard of the downlink audio and/or video. The coding standard includes at least one of a coding rate, a coding format, a sampling rate, resolution, and a frame rate.

In the call system provided in this embodiment, by lowering the coding standard, a quantity and sizes of call data packets transmitted on the terminal side link can be reduced, to reduce a packet loss, jitter, and a latency of the call data packet on the terminal side link, improve the call quality, and further improve user experience.

In some embodiments, a device network includes the host and at least one extension, and electronic devices in the device network can communicate with each other.

In some embodiments, the host determines a human-computer interaction device in the device network after receiving an incoming call notification sent by the network side device; and the host sends the incoming call notification to the human-computer interaction device, to control the human-computer interaction device to perform incoming call reminding. According to the call system provided in this embodiment, the host may control the electronic device operated by the user to perform incoming call reminding, so that the user answers the call nearby.

In some embodiments, a first-priority device in the device network sends an incoming call notification after the host receives the incoming call notification sent by the network side device, to control the first-priority device to perform incoming call reminding. The host sends the incoming call notification to a second-priority device in the device network after duration T1 for which the first-priority device keeps reminding, to control the second-priority device to perform incoming call reminding. In addition, the host sends the incoming call notification to a third-priority device in the device network after duration T2 for which the second-priority device keeps reminding, to control the third-priority device to perform incoming call reminding. A priority of the electronic device in the device network, T1, and T3 are all preset.

The first-priority device may be the host. The second-priority device may be an electronic device that is generally only used by the user, such as a mobile phone or a smart watch. The third-priority device may be an electronic device that is generally used by another user other than an owner, such as a tablet computer, a notebook computer, or a smart television.

According to the call system provided in this embodiment, after receiving an incoming call from the network side device, the host may control the electronic devices in the device network to ring sequentially in a specific sequence, so that the user chooses to answer the call on an electronic device closest to the user or an electronic device that the user wants to use.

In some embodiments, after receiving an incoming call notification sent by the network side device, the host sends the incoming call notification to electronic devices in the device network in a sequence based on whether a battery level is not lower than a battery level threshold or is lower than the battery level threshold, to control the electronic devices in the device network to perform incoming call reminding; or the host controls only an electronic device that is in the device network and whose battery level is not lower than a battery level threshold to perform incoming call reminding. The call system provided in this embodiment can reduce power consumption of a low-power device in the device network, and prolong use time of the low-power device.

In some embodiments, after receiving the incoming call notification sent by the network side device, the host determines a same-number device of the host in the device network. A subscriber identity module SIM card of the same-number device and a SIM card of the host correspond to a same phone number; and the incoming call notification is not sent to the same-number device. According to the call system provided in this embodiment, the same-number device of the host can be avoided from receiving repeated incoming call notifications.

In some embodiments, if the extension receives both the incoming call notification sent by the host and the incoming call notification sent by the network side device, and the two incoming call notifications are incoming calls of a same number, either of the two incoming call notifications is ignored, to avoid the extension from repeatedly performing incoming call reminding for the incoming call of the same number.

In some embodiments, the host sends, in response to an operation of sharing a call by the user, the downlink audio and/or video to at least one extension in the device network when locally playing the downlink audio and/or video in the call data packet. This embodiment provides a conference mode, to be specific, in a process of participating in a conference, the host may share a downlink audio and/or video of the conference to another extension in the device network, so that a user of the another extension listens to the conference. However, in this embodiment, because the extension does not collect audio information, the user of the extension cannot speak in a conference process.

In some embodiments, when sending the downlink audio and/or video to the at least one extension in the device network, the host further receives an uplink audio sent by the at least one extension; and the host combines the uplink audio sent by the at least one extension with a locally collected uplink audio, and sends a combined uplink audio to the network side device. In the conference mode provided in this embodiment, the user of the extension may listen to the conference, and also speak during the conference.

In some embodiments, when the host locally answers a call, in response to an operation of transferring the call by the user, the host suspends locally collecting and playing the call data packet, and controls the extension to collect and play the call data packet. According to the call system provided in this embodiment, the host may transfer the call to the extension for processing, while the host only transparently transmits the call data packet between the network side device and the extension.

In some embodiments, after locally answering an incoming call, the host sends a call answer notification to each extension in the device network. The call answer notification includes incoming call information. Each extension displays the incoming call information and a call answer control. Any extension sends a call transfer request to the host after receiving an operation performed by the user on the call answer control. In response to the call transfer request, the host suspends locally collecting and playing the call data packet, and controls the any extension to collect and play the call data packet.

According to the call system provided in this embodiment, in a process in which the host performs the call, the user may operate the call answer control on the any extension, to transfer the call to the extension for processing. For example, when a power level of the host is low, after the call is transferred to the extension for processing, power consumption of the host can be reduced.

In some embodiments, after locally answering an incoming call, the extension sends a call answer notification to another electronic device in the device network. The call answer notification includes call information. The another electronic device displays the incoming call information and a call answer control. Any one electronic device in the another electronic device sends a call transfer request to the host after receiving an operation performed by the user on the call answer control. In response to the call transfer request, the host controls the extension to stop collecting and playing the call data packet, and controls the any one electronic device in the another electronic device to collect and play the call data packet.

According to the call system provided in this embodiment, in a process in which the extension performs a call, the user may operate the call answer control on the another electronic device (for example, the host or the another extension) in the device network, to transfer the call to the another electronic device for processing.

In some embodiments, the host or the extension displays a first answer control and a second answer control when there is an incoming second call in a process of locally processing a first call. The first answer control is configured to locally answer the second call, and the second answer control is configured to answer the second call on another electronic device in the device network. The host or the extension controls the another electronic device to answer the second call after detecting an operation performed by the user on the second answer control.

According to the call system provided in this embodiment, in an example, in a process of performing the first call, an electronic device 1 may select, based on an operation performed by the user on the second answer control, an electronic device 2 to answer the second call, and simultaneously process the two calls that call the same electronic device. This avoids a case in a current technology of holding (Hold) the first call to answer the second call, and a peer end of the first call does not play a ring back tone, to have good user experience.

In some embodiments, the host or the extension sends a downlink video to a first electronic device in the device network, and receives an uplink video collected by the first electronic device. The host or the extension sends a downlink audio to a second electronic device in the device network, and receives an uplink audio collected by the second electronic device. The first electronic device is different from the second electronic device.

It should be noted that in this embodiment, the first electronic device or the first electronic device may be a local phone that processes the call, or may be another electronic device in the device network.

According to the call system provided in this embodiment, in a process of performing a video call, the electronic device may separately process audio and a video on different electronic devices based on a requirement of the user to have good user experience. For example, in a call process, the audio is controlled to be processed locally, and the video is controlled to be played on a smart speaker, to enlarge a video image and improve an audio play effect.

In some embodiments, the host or the extension controls a first electronic device in the device network to play downlink audio and/or video, and receives an uplink audio and/or video collected by a second electronic device, where the first electronic device is different from the second electronic device.

According to the system provided in this embodiment of this application, when an audio or video processing apparatus (such as a microphone, a loudspeaker, or a camera) is faulty, the host or the extension may select, based on a user instruction, another electronic device to separately process a processing task of the faulty processing apparatus, to ensure normal call processing.

According to a second aspect, an embodiment of this application provides an extension, where the extension and a host are connected through a first terminal side link, and the host and a network side device are connected through a network side link. The extension exchanges a call data packet with the network side device through the first terminal side link and the network side link. The extension is configured to: transmit the call data packet with the host through a second terminal side link when call quality of the extension is lower than a quality threshold, where the first terminal side link is different from the second terminal side link.

In this embodiment, in a process in which the extension communicates with the host through the first terminal side link, when the call quality of the extension is poor, the extension may transmit the call data packet with the host through the second terminal side link, to improve the call quality of the extension and improve user experience.

In some embodiments, the second terminal side link is a communication link pre-established by the host and the extension. By pre-establishing the communication link, when the call quality of the extension is lower than the quality threshold, the extension may immediately use the second terminal side link to transmit the call data packet, to quickly improve the call quality.

In some other embodiments, the second terminal side link is a communication link newly established by the host and the extension when the call quality of the extension is lower than the quality threshold, so that resource overheads of the extension can be saved.

In some embodiments, the transmitting the call data packet with the host through a second terminal side link when call quality of the extension is lower than a quality threshold includes: The extension and the host jointly transmit the call data packet through the first terminal side link and the second terminal side link when the call quality of the extension is lower than the quality threshold. In this embodiment, the extension and the host jointly transmit the call data packet through the two links, so that a parameter such as a packet loss, jitter, or a latency in a data packet transmission process can be reduced, to improve the call quality.

In addition, the extension and the host may further transmit the call data packet through only the second terminal side link, not through the first terminal side link having poor call quality.

In some embodiments, the first terminal side link or the second terminal side link is: a Bluetooth link, a wireless fidelity Wi-Fi link, or a data service link. The Wi-Fi link may be a Wi-Fi local area network link or a Wi-Fi P2P link. When the host has two SIM cards, the data service link may be a data service link established by the host and the extension by using a SIM card 1, or a data service link established by the host and the extension by using a SIM card 2.

In some embodiments, the extension is further configured to: when the call quality of the extension is lower than the quality threshold, display prompt information, where the prompt information is used to prompt a user to control the extension to approach the host. For example, in a scenario of a voice or video call, the prompt information may prompt a voice "beep ~" or "The signal of the extension is weak. Please approach the host." In the scenario of a video call, the prompt information may be text information: "The signal of the extension is weak. Please approach the host."

In some embodiments, the extension is further configured to: detect first call quality of the first terminal side link and second call quality of the second terminal side link; and disconnect the second terminal side link when the first call quality is higher than the quality threshold; or disconnect the first terminal side link when the second call quality is higher than the quality threshold.

In this embodiment, the extension may select the terminal side link having best call quality to communicate with the host, so that the extension can be avoided from maintaining a plurality of terminal side links at the same time while the call quality of the extension is ensured, to save resource overheads of the extension.

In some embodiments, the extension is further configured to: when the call quality of the extension is lower than the quality threshold, lower a coding standard of an uplink audio and/or video in the call data packet. The coding standard includes at least one of a coding rate, a coding format, a sampling rate, resolution, and a frame rate.

In this embodiment, by lowering the coding standard, a quantity and sizes of call data packets transmitted on the terminal side link can be reduced, to reduce a packet loss, jitter, and a latency of the call data packet on the terminal side link, improve the call quality of the extension, and further improve user experience.

In some embodiments, the extension and the host are located in a same device network, and electronic devices in the device network can communicate with each other.

In some embodiments, the extension is further configured to: if the extension receives both an incoming call notification sent by the host and an incoming call notification sent by the network side device, and the two incoming call notifications are incoming calls of a same number, ignore either of the two incoming call notifications, to avoid the extension from repeatedly performing incoming call reminding for the incoming call of the same number.

In some embodiments, the extension is further configured to display a first answer control and a second answer control when there is an incoming second call in a process of locally processing a first call, where the first answer control is configured to locally answer the second call, and the second answer control is configured to answer the second call on another electronic device in the device network; and control, in response to an operation performed by the user on the second answer control, the another electronic device to answer the second call.

In this embodiment, when receiving the second call in a process of performing the first call, the extension may select, based on an operation performed by the user on the second answer control, the another electronic device to answer the second call, and processes the two calls at the same time. This avoids a case in a current technology of holding (Hold) the first call to answer the second call, and a peer end of the first call does not play a ring back tone, to have good user experience.

In some embodiments, the extension is further configured to: send a downlink video to a first electronic device in the device network, and receive an uplink video collected by the first electronic device; and send a downlink audio to a second electronic device in the device network, and receive an uplink audio collected by the second electronic device, where the first electronic device is different from the second electronic device.

In this embodiment, in a process of performing a video call, the extension may separately process audio and a video on different electronic devices based on a requirement of the user, to have better user experience.

In some embodiments, the extension is further configured to: control a first electronic device in the device network to play downlink audio and/or video, and receive an uplink audio and/or video collected by a second electronic device, where the first electronic device is different from the second electronic device.

In this embodiment, in a case in which an audio or video processing apparatus (such as a microphone, a loudspeaker, a camera, or a display screen) is faulty, the extension may select, based on a user instruction, another electronic device to separate process a processing task of the faulty processing apparatus, to ensure normal running of the call on an extension side.

According to a third aspect, an embodiment of this application further provides a host, where a network side device and the host are connected through a network side link, the host and an extension are connected through a first terminal side link, and the extension exchanges a call data packet with the network side device through the first terminal side link and the network side link. The host is configured to transmit the call data packet with the extension through a second terminal side link when call quality of the extension is lower than a quality threshold, where the first terminal side link is different from the second terminal side link.

In this embodiment, in a process in which the host communicates with the extension through the first terminal side link, when detecting that the call quality of the extension is poor, the host may transmit the call data packet with the extension through the second terminal side link, to improve the call quality of the extension and improve user experience.

In some embodiments, the second terminal side link is a communication link pre-established by the host and the extension. By pre-establishing the communication link, when the call quality of the extension is lower than the quality threshold, the host may immediately use the second terminal side link to transmit the call data packet, to quickly improve the call quality of the extension.

In some other embodiments, the second terminal side link is a communication link newly established by the host and the extension when the call quality of the extension is lower than the quality threshold, so that resource overheads of the host can be saved.

In some embodiments, the host is further configured to: jointly transmit the call data packet with the extension through the first terminal side link and the second terminal side link when the call quality of the extension is lower than the quality threshold. In this embodiment, the host and the extension jointly transmit the call data packet through the two links, so that a parameter such as a packet loss, jitter, or a latency in a data packet transmission process can be reduced, to improve the call quality.

In some embodiments, the first terminal side link or the second terminal side link is: a Bluetooth link, a wireless fidelity Wi-Fi link, or a data service link.

In some embodiments, the host is further configured to: when the call quality of the extension is lower than the quality threshold, lower a coding standard of a downlink audio and/or video in the call data packet; and/or send a coding standard change request to the network side device, to request the network side device to lower a coding standard of the downlink audio and/or video in the call data packet. The coding standard includes at least one of a coding rate, a coding format, a sampling rate, resolution, and a frame rate.

In some embodiments, the extension and the host are located in a same device network, and electronic devices in the device network can communicate with each other.

In some embodiments, the host is further configured to: determine a human-computer interaction device in the device network after receiving an incoming call notification sent by the network side device; and send the incoming call notification to the human-computer interaction device, to control the human-computer interaction device to perform incoming call reminding.

In some embodiments, the host is further configured to: send an incoming call notification to a first-priority device in the device network after receiving the incoming call notification sent by the network side device, to control the first-priority device to perform incoming call reminding; and send the incoming call notification to a second-priority device in the device network after duration T1 for which the first-priority device keeps reminding, to control the second-priority device to perform incoming call reminding, where both a priority of the electronic device in the device network and T1 are preset.

In this embodiment, after receiving an incoming call from the network side device, the host may control all electronic devices in the device network to ring sequentially in a specific sequence, so that a user chooses to answer the call on an electronic device closest to the user or an electronic device that the user wants to use.

In some embodiments, the host is further configured to: after receiving an incoming call notification sent by the network side device, control, in a sequence based on whether a battery level is not lower than a battery level threshold or is lower than the battery level threshold, electronic devices in the device network to perform incoming call reminding; or control only an electronic device that is in the device network and whose battery level is not lower than a battery level threshold to perform incoming call reminding. In this embodiment, the host may reduce power consumption of a low-power device in the device network, and prolong use time of the low-power device.

In some embodiments, the host is further configured to: after receiving the incoming call notification sent by the network side device, determine a same-number device of the host in the device network, where a subscriber identity module SIM card of the same-number device and a SIM card of the host correspond to a same phone number; and not send the incoming call notification to the same-number device, to avoid the extension from repeatedly performing incoming call reminding for the incoming call of the same number.

In some embodiments, the host is further configured to: send, in response to an operation of sharing a call by the user, the downlink audio and/or video to the at least one extension in the device network when locally playing the downlink audio and/or video in the call data packet. This embodiment provides a conference mode, to be specific, in a process of participating in a conference, the host may share a downlink audio and/or video of the conference to another extension in the device network, so that a user of the another extension listens to the conference.

In some embodiments, the host is further configured to: receive an uplink audio sent by the at least one extension: combine the uplink audio sent by the at least one extension with a locally collected uplink audio; and send a combined uplink audio to the network side device.

In some embodiments, the host is further configured to: in a local call process, in response to an operation of transferring the call by the user, suspend locally collecting and playing the call data packet, and control a target electronic device in the device network to collect and play the call data packet. In this embodiment, the host may operate locally, and transfer the call to the extension for processing, while the host only transparently transmits the call data packet between the network side device and the extension.

In some embodiments, the host is further configured to: in a local call process, send a call answer notification to each extension in the device network, where the call answer notification is used by the extension to display incoming call information and a call answer control, and the call answer control is configured to send a call transfer request to the host based on a user instruction; and after receiving the call transfer request, suspend locally collecting and playing the call data packet, and control the extension corresponding to the call transfer request to collect and play the call data packet.

In some embodiments, the host is further configured to: display a first answer control and a second answer control when there is an incoming second call in a process of processing a first call, where the first answer control is configured to locally answer the second call, and the second answer control is configured to answer the second call on another electronic device in the device network: and control, in response to an operation performed by the user on the second answer control, the another electronic device to answer the second call.

In this embodiment, after receiving the second call in the process of performing the first call, the host may select the extension to answer the second call based on the operation performed by the user on the second answer control, and processes the two calls at the same time. This avoids a case in a current technology of holding (Hold) the first call to answer the second call, and a peer end of the first call does not play a ring back tone, to have good user experience.

In some embodiments, the host is further configured to: send a downlink video to a first electronic device in the device network, and receive an uplink video collected by the first electronic device; and send a downlink audio to a second electronic device in the device network, and receive an uplink audio collected by the second electronic device, where the first electronic device is different from the second electronic device.

In some embodiments, the host is further configured to: control a first electronic device in the device network to play a downlink audio and/or video, and receive an uplink audio and/or video collected by a second electronic device, where the first electronic device is different from the second electronic device.

According to a fourth aspect, an embodiment of this application provides a call method, where the method is applied to an extension, the extension and a host are connected through a first terminal side link, the host and a network side device are connected through a network side link, and the method includes content performed by the extension in the second aspect.

According to a fifth aspect, an embodiment of this application provides a call method, where the method is applied to a host, a network side device and the host are connected through a network side link, the host and an extension are connected through a first terminal side link, and the method includes content performed by the host in the third aspect.

According to a sixth aspect, an embodiment of this application provides a computer-readable storage medium, where the computer-readable storage medium stores a computer program. When the computer program is executed by a processor, the call method shown in the fourth aspect is implemented.

According to a seventh aspect, an embodiment of this application provides a computer-readable storage medium, where the computer-readable storage medium stores a computer program. When the computer program is executed by a processor, the call method shown in the fifth aspect is implemented.

According to an eighth aspect, an embodiment provides a computer program product, where the program product includes a program. When the program is run by a device, an extension is enabled to implement the call method shown in the fourth aspect.

According to a ninth aspect, an embodiment provides a computer program product, where the program product includes a program. When the program is run by a device, a host is enabled to implement the call method shown in the fifth aspect.

According to a tenth aspect, an embodiment of this application provides a chip, used in an extension, where the extension and a host are connected through a terminal side link, the host and a network side device are connected through a network side link, the chip includes a memory and a processor, and the processor executes a computer program stored in the memory, to control the call method shown in the fourth aspect.

According to an eleventh aspect, an embodiment of this application provides a chip, used in a host, where the host and a network side device are connected through a network side link, and the host and an extension are connected through a terminal side link, the chip includes a memory and a processor, and the processor executes a computer program stored in the memory, to control the call method shown in the fifth aspect.

It may be understood that, for beneficial effects of the fourth aspect to the eleventh aspect, refer to related descriptions of the first aspect to the third aspect. Details are not described herein again.

BRIEF DESCRIPTION OF DRAWINGS

FIG. 15 is a schematic diagram 2 of an interface of an electronic device according to an embodiment of this application;

FIG. 16a is a schematic diagram 1 of audio and video processing according to an embodiment of this application;

FIG. 16b is a schematic diagram 2 of audio and video processing according to an embodiment of this application;

DESCRIPTION OF EMBODIMENTS

Figures 1A, 1B:
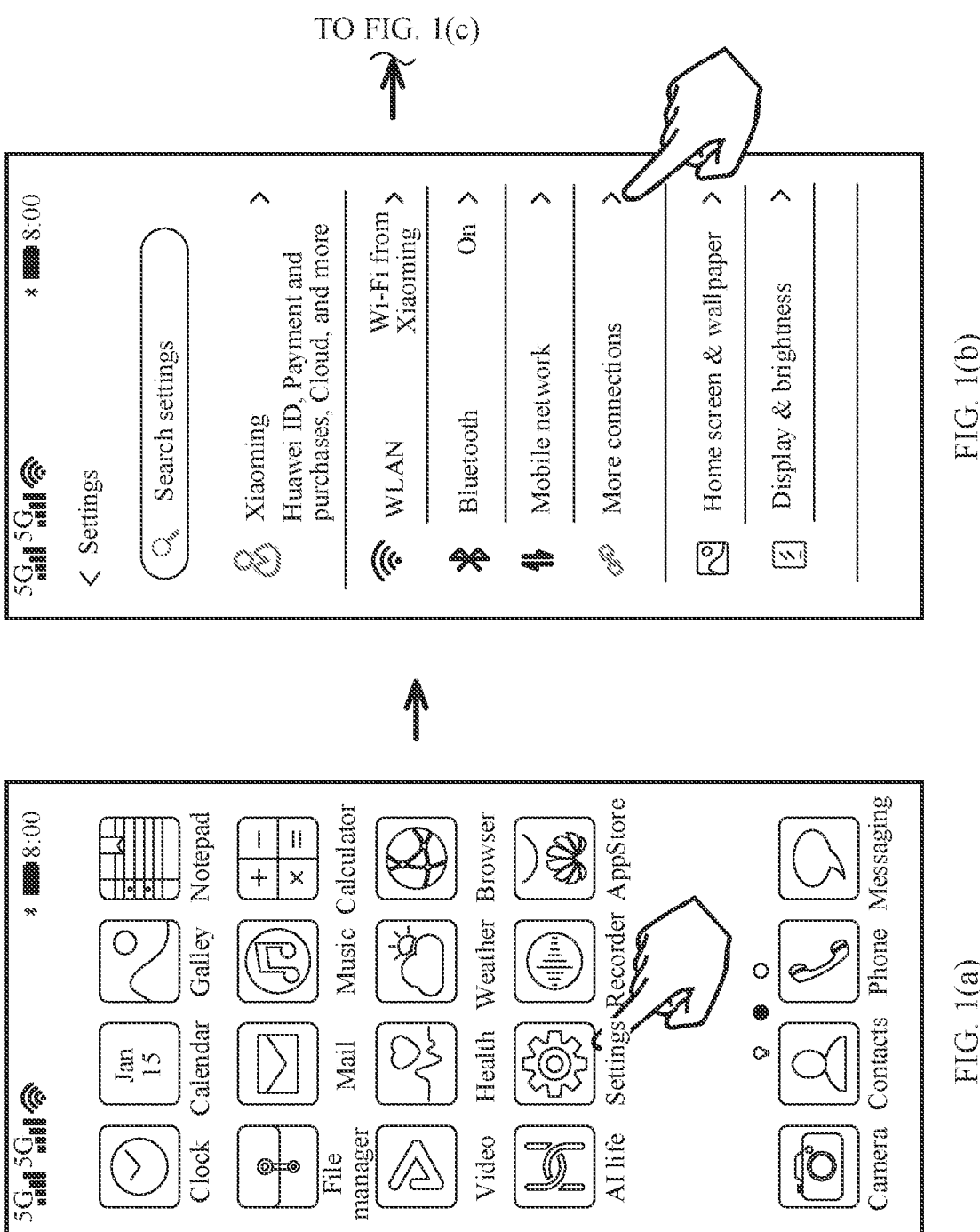
FIG. 1(a) to FIG. 1(e) are a schematic diagram of a networking control interface according to an embodiment of this application.

The following describes the technical solutions in embodiments of this application with reference to the accompanying drawings in embodiments of this application.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th Generation, 5G) system or new radio (New Radio, NR), a global system for mobile communications (global system for mobile communications, GSM), a code division multiple access (code division multiple access, CDMA) communication system, a time division-synchronous code division multiple access (time division-synchronous CDMA, TD-SCDMA) communication system, or the like.

The technical solution provided in embodiments is applicable to calls such as a circuit switched (Circuit Switched, CS), a voice over long-term evolution (Voice over Long-Term Evolution, VoLTE), a voice over new radio (Voice over New Radio, VoNR), a video over long-term evolution (Video over Long-Term Evolution, ViLTE), a video over new radio (Video over New Radio, ViNR), evolved packet system fallback (Evolved Packet System fallback, EPS fallback). CS fallback (CS fallback), a voice over wireless fidelity (wireless fidelity, Wi-Fi) (Voice over Wi-Fi, VoWi-Fi), or a video over Wi-Fi (Video over Wi-Fi, ViWi-Fi).

In the embodiments, an electronic device may be a terminal device such as a mobile phone, a tablet computer, a notebook computer, a desktop computer, a smart television, a wearable device (for example, a smart watch), a vehicle-mounted device, a smart home device (for example, a smart speaker), an augmented reality (augmented reality, AR)/virtual reality (virtual reality, VR) device, an ultra-mobile personal computer (ultra-mobile personal computer, UMPC), a netbook, a personal digital assistant (personal digital assistant, PDA), or a headset, and a relay device (for example, a customer premise equipment (customer premise equipment, CPE)). A specific type of the electronic device is not limited in embodiments of this application.

A network side device in embodiments of this application may have a device that can provide a random access function for the electronic device or a chip that can be disposed on the device. The device includes but is not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), or a baseband unit (baseband unit, BBU), may be a gNB or a transmission point (TRP or TP) in a 5G system, for example, in an NR system, or one or a group (including a plurality of) of antenna panels of a base station in a 5G system, or may be further a network node that forms a gNB or a transmission point, for example, a baseband unit (BBU), a distributed unit (DU, distributed unit), a network side device in a future 5G network, or a network side device in a future evolved PLMN network. This is not limited in embodiments of this application.

Currently, electronic devices are diversified, and also play an important role in people's daily life. More and more users have a plurality of electronic devices at the same time. For example, the users have a mobile phone, a tablet computer, a smart TV, and a Bluetooth speaker. To implement data sharing between the devices, the plurality of electronic devices may be connected to each other to establish a device network.

A process of establishing the device network includes a device discovery and a device connection. In the embodiments, a device discovery manner may be local area network discovery, touch discovery. Bluetooth discovery, address resolution protocol (Address Resolution Protocol, ARP) discovery, user datagram protocol (user datagram protocol, UDP) multicast or broadcast discovery, device information acquisition from a server, or the like. A device connection manner may be a local area network (local area network, LAN) connection, a Wi-Fi direct connection, a Bluetooth (Bluetooth, BT) connection, a peer to peer (Peer to Peer, P2P) connection, a data service connection, or the like. This is not limited in this embodiment.

The following uses an example in which an electronic device 1 initiating device networking is a mobile phone, to describe a process of establishment the device network in embodiments of this application.

Figures 1C, 1D, 1E:
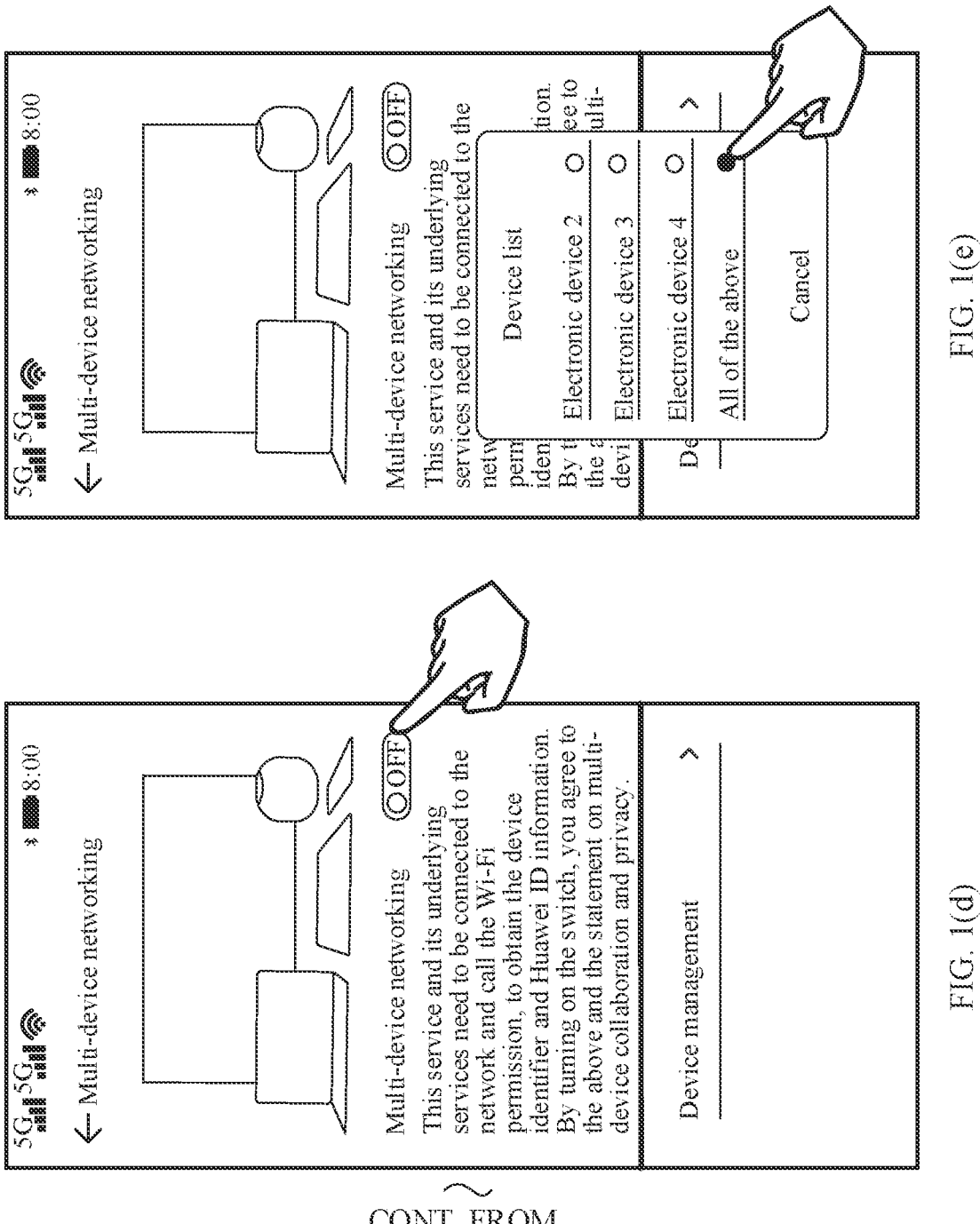

FIG. 1(*a*) to FIG. 1(*e*) are a schematic diagram of a networking control interface according to an embodiment of this application. Refer to FIG. 1(*a*). After detecting an operation performed by a user on a "Settings" icon on an interface of a mobile phone, the mobile phone displays a setting interface shown in FIG. 1(*b*). After detecting an operation performed by the user on a "More connections" option in the setting interface, the mobile phone displays, for example, a selection interface shown in FIG. 1(*c*). After detecting an operation performed by the user on a "Multi-device networking" option in the selection interface, the mobile phone displays, for example, a control interface shown in FIG. 1(*d*). An example in which an electronic device establishes a device network based on a local area network is used. After detecting an operation of enabling a multi-device networking function by the user, the mobile phone starts to scan the electronic device in the local area network, and displays, based on a scanning result, a device list shown in FIG. 1(*e*). For example, electronic devices in the current local area network include an electronic device 1, an electronic device 2, an electronic device 3, and an electronic device 4. A device list displayed by the electronic device 1 includes the electronic device 2, the electronic device 3, and the electronic device 4. The user may select one or more electronic devices from the device list to establish the device network.

Optionally, for an electronic device, for example, the electronic device 1, whose "Multi-device networking" option is enabled in the device network, after the electronic device leaves the current local area network, the electronic device automatically exits the current device network. When the electronic device 1 accesses the local area network again, the electronic device 1 automatically joins the device network in the local area network, and the user does not need to perform a manual operation.

In embodiments, an operation performed by the user on one control or one option includes tapping, double-tapping, tapping and holding, and pressing the control or option by gravity by using a touch operation, selecting the control or option by using a remote management, tapping the control or option by using a mouse, or selecting the control or option by using audio control, and the like. A specific manner thereof is not limited in the embodiments.

Figure 2:
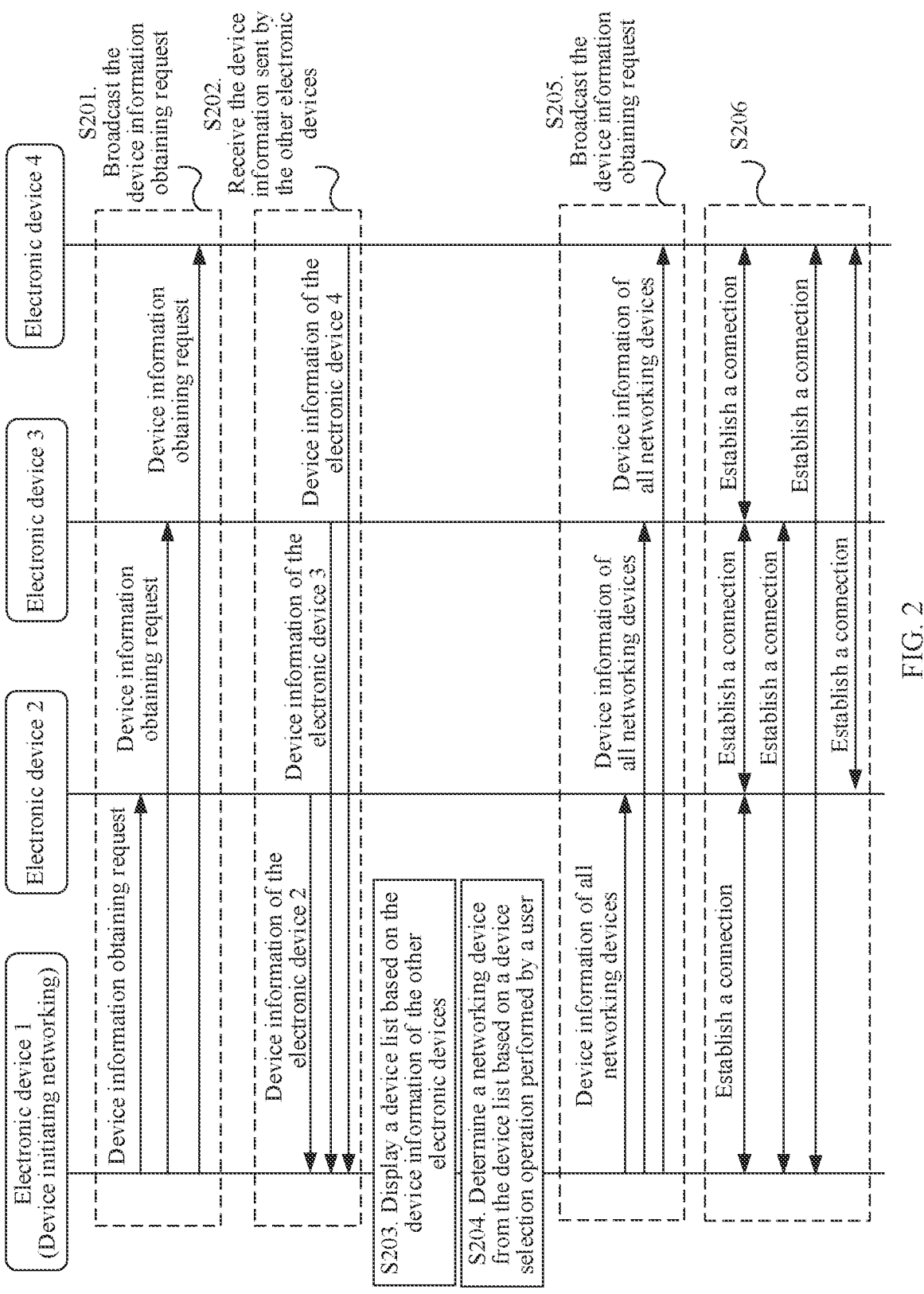
FIG. 2 is a flowchart of device networking according to an embodiment of this application.

FIG. 2 is a flowchart of device networking according to an embodiment of this application, and relates to a process in which an electronic device 1 establishes a device network by using a local area network broadcast and a Wi-Fi direct connection.

S201. In response to a networking instruction of a user, the electronic device 1 broadcasts a device information obtaining request to another electronic device in a local area network.

For example, electronic devices currently connected to the local area network include the electronic device 1, an electronic device 2, an electronic device 3, and an electronic device 4. In the local area network, the electronic devices may be connected by using a router. Therefore, in an example, in response to an operation of enabling a multi-device networking function of the electronic device 1 by the user, the electronic device 1 may send the device information obtaining request to a specific port of the router by using a UDP broadcast. The another electronic device in the local area network receives the device information obtaining request by listening to the port. The device information obtaining request carries device information of the electronic device 1, and the device information includes a device name, a device model, an internet protocol (internet protocol, IP) address, a device account, and the like.

S202. The electronic device 1 receives device information sent by the another electronic device in the local area network.

After the another electronic device in the local area network receives the device information obtaining request, if the electronic device enables a device discovery permission and currently logs in to the device account carried in the device information obtaining request, the electronic device sends the device information of the electronic device to the mobile phone based on the IP address in the request.

S203, The electronic device 1 displays a device list based on the device information of the another electronic device. For the device list, refer to FIG. 1(*e*). Details are not described herein again in this embodiment.

S204. The electronic device 1 determines a networking device from the device list based on a device selection operation entered by the user.

The user may select one or more electronic devices from the device list as the networking device, for example, select the electronic device 2, the electronic device 3, or the electronic device 4 as the networking device.

S205. The electronic device 1 sends the device information of all the networking devices to each networking device. In S205, the electronic device 1, the electronic device 2, the electronic device 3, and the electronic device 4 in the local area network obtain an IP address of each other.

S206. Each electronic device establishes a connection.

Optionally, the electronic device 1, the electronic device 2, the electronic device 3, and the electronic device 4 each may establish a Socket connection based on the IP address of each other, to implement the Wi-Fi direct connection and complete establishment of the device network.

In addition, in response to the networking instruction of the user, the electronic device may also automatically establish the device network based on a historical networking record. After the networking succeeds, the electronic device may further manage the device network by using, for example, a "Device management" option shown in FIG. 1(*e*). For example, the electronic device controls the another electronic device to join the current device network, or deletes an electronic device that has accessed the current device network.

Figure 3:
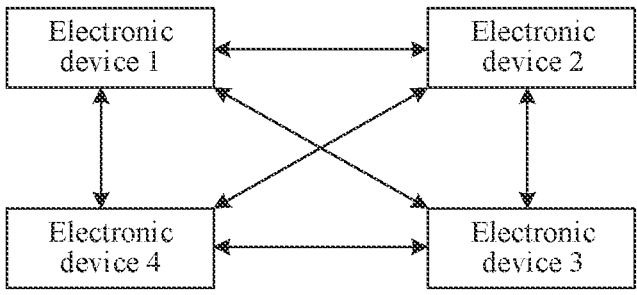
FIG. 3 is a schematic diagram of a structure of a device network according to an embodiment of this application.

FIG. 3 is a schematic diagram of a structure of a device network according to an embodiment of this application. Refer to FIG. 3, Generally, after networking is completed, an electronic device 1, an electronic device 2, an electronic device 3, and an electronic device 4 are connected to each other, and may directly communicate with each other. However, in some embodiments, some electronic devices in the device network may not be directly connected due to a long distance between each other, a poor network signal, or the like. Therefore, after joining the device network, the electronic device needs to perform link detection to determine a communication link between the electronic device and another electronic device. If the electronic device cannot directly communicate with one electronic device, at least one relay device is determined in the device network, to establish a connection by using the relay device.

That is, in the device network provided in this embodiment, two electronic devices may directly communicate with each other, or another electronic device may be used as the relay device for communication. For example, the electronic device 1 and the electronic device 3 may directly communicate with each other, or the electronic device 2 may be used as the relay device for communication. In this embodiment, there may be one or more (for example, two) relay devices on one communication link. Optionally, to reduce a latency of data relay transmission, a maximum of two relay devices are allowed to be used on the communication link.

Figure 4:
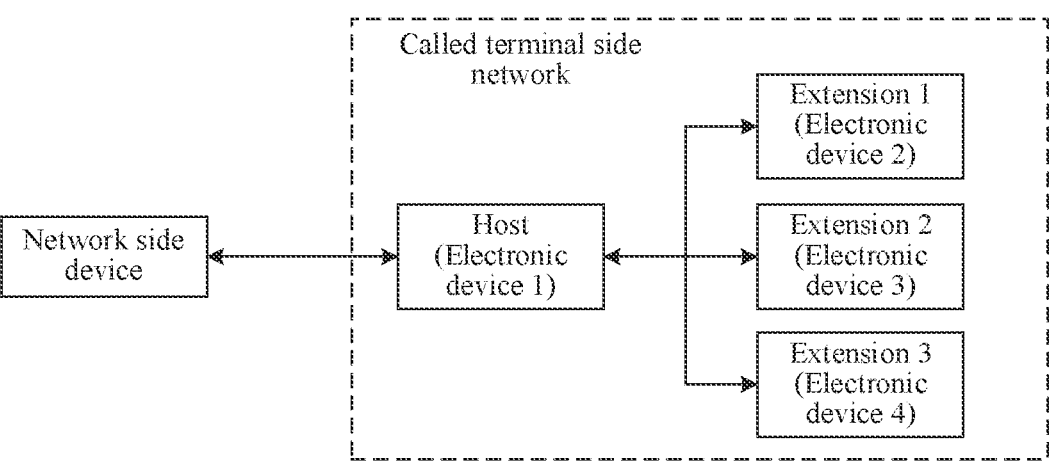
FIG. 4 is a schematic diagram of a structure of a communication system according to an embodiment of this application.

Based on the device network provided in this embodiment of this application, after an electronic device (for example, a mobile phone) having a cellular communication function receives an incoming call, the electronic device may notify one or more other electronic devices in the device network of the incoming call, and a user may answer the call by using the another electronic device. In this embodiment, an electronic device that directly communicates with a network side device in the device network is a host, and the another electronic device is an extension. For example, refer to FIG. 4. The electronic device 1 directly communicates with the network side device. Therefore, the electronic device 1 is a host of the call, and the electronic device 2, the electronic device 3, and the electronic device 4 are respectively an extension 1, an extension 2, and an extension 3 of the call.

In this embodiment, a communication link between the host and the network side device is referred to as a network side link, and a communication link between the host and the extension in the device network is referred to as a terminal side link. In a process in which the user uses the extension to perform a call, the network side device sends a downlink call data packet to the host through the network side link, and the host then transmits the downlink call data packet to the extension through the terminal side link. In addition, the extension sends an uplink call data packet to the host through the terminal side link, and the host sends the uplink call data packet to the network side device through the network side link.

Figure 5:
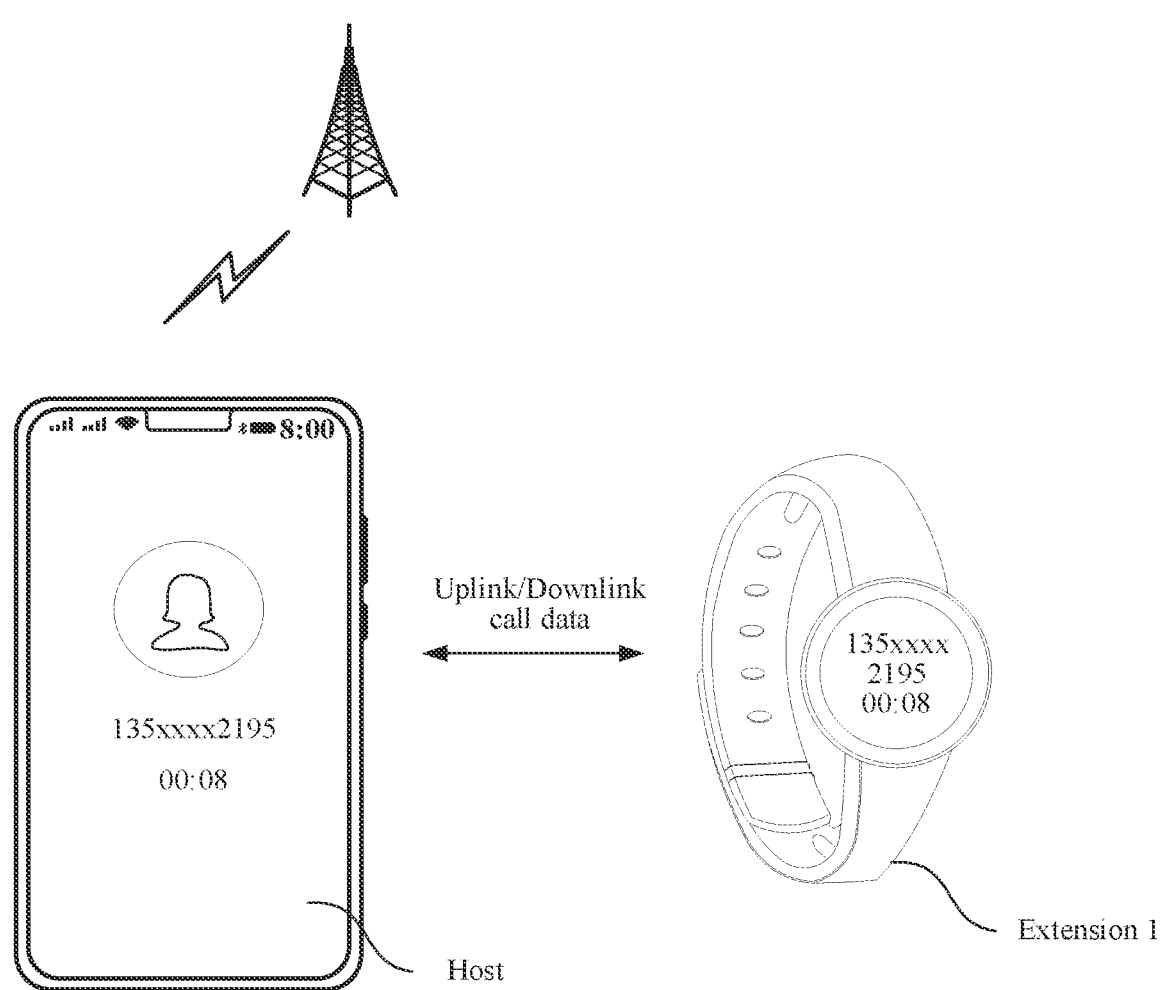
FIG. 5 is a schematic diagram 1 of a call scenario according to an embodiment of this application.

An example in which the user answers an incoming call from the host (for example, a mobile phone) on the extension 1 (for example, a smart watch) is used. Refer to FIG. 5, in a call process, the mobile phone forwards, to the smart watch for playing, a downlink call data packet sent by the network side device, and sends, to the network side device, an uplink call data packet collected by the smart watch. However, in the call process, when the user carries the smart watch away from the mobile phone, quality of a communication link (for example, a. Bluetooth link) between the mobile phone and the smart watch gradually deteriorates, and a packet loss rate, jitter, and a latency of the uplink and downlink call data packets increase. Consequently; call quality deteriorates, or even the call is interrupted.

Therefore, embodiments of this application provide a call method, to resolve a problem that call quality is poor or even a call is interrupted in a process in which the user makes a call by using the extension.

Figure 6:
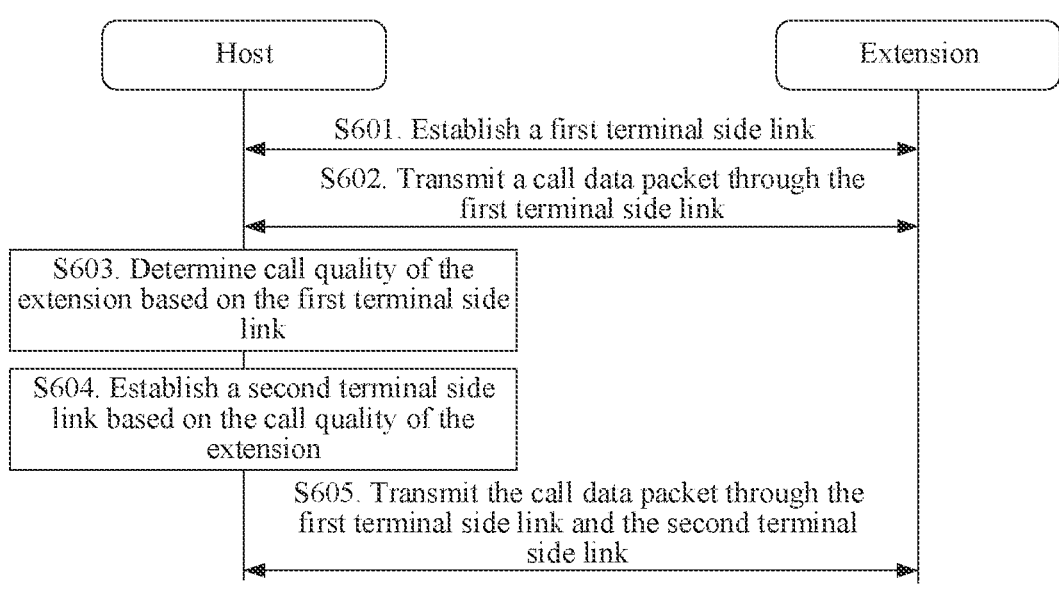
FIG. 6 is a flowchart of a call method according to an embodiment of this application.

FIG. 6 is a flowchart of a call method according to an embodiment of this application, and relates to a process of adding a new terminal side link to an original terminal side link between a host and an extension, to improve call quality of the extension.

S601. The host and the extension establish a first terminal side link.

Figure 7:
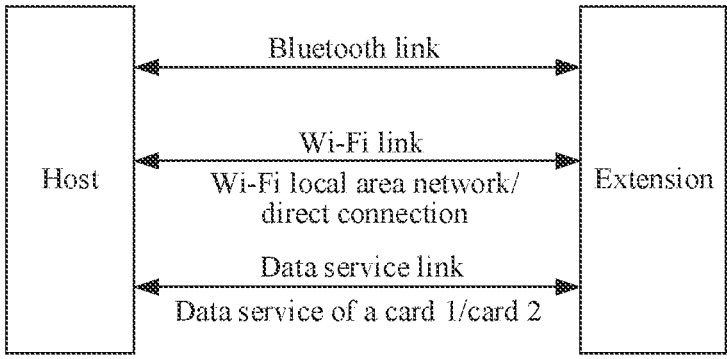
FIG. 7 is a schematic diagram of a communication link according to an embodiment of this application.

In this embodiment, refer to FIG. 7. The terminal side link between the host and the extension may be a Bluetooth link, a Wi-Fi link, or a data service link. The Bluetooth link may be a conventional Bluetooth link or a Bluetooth low energy (Bluetooth low Energy, BLE) link. The Wi-Fi link may be a Wi-Fi local area network link or a Wi-Fi direct link. In the Wi-Fi local area network link, a hotspot device may be a router, or may be the host or the extension. When the host has two subscriber identity module (subscriber identity module, SIM) cards, the data service link may be a data service link established between the host and the extension by using a SIM card 1, or a data service link established by using a SIM card 2. In the data service link, a P2P connection may be performed between the host and the extension, or a relay connection may be performed by using a server. The data service link between the host and the extension refers to a communication link established by the host and the extension by using a base station. A SIM card may be a physical SIM card, an embedded-SIM (embedded-SIM, e-SIM) card, a virtual SIM card, or the like.

In this embodiment, the first terminal side link may be any communication link shown in FIG. 7.

When the terminal side link established between the host and the extension is the Bluetooth link or the Wi-Fi link, the extension may power off an internet protocol multimedia subsystem (Internet Protocol Multimedia Subsystem, IMS) protocol stack of the extension, to reduce power consumption. After the IMS protocol stack is powered off, the extension can be used as a Bluetooth headset.

S602. The host and the extension transmit a call data packet through the first terminal side link.

Figure 8:
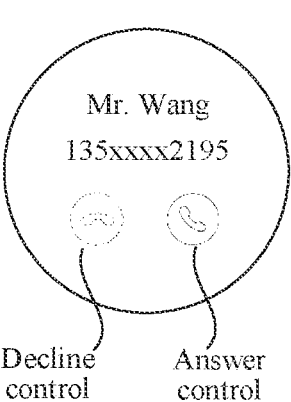
FIG. 8 is a schematic diagram of an incoming call interface according to an embodiment of this application.

For a scenario in which the host receives an incoming call, after receiving an incoming call notification sent by a network side device, the host sends the incoming call notification to the extension through the first terminal side link. The extension displays an incoming call interface based on the incoming call notification. For example, the extension is a smart watch. The incoming call interface may be shown in FIG. 8, and includes incoming call number information (for example, 135xxxx2195), an answer control, and a decline control. In response to an operation performed by a user on the answer control, the extension communicates with the host through the first terminal side link, and transmits the call data packet.

In a scenario in which the host makes an outgoing call, if the user transfers the current call from the host to the extension for processing, after the call is connected, the host and the extension also communicate with each other through the first terminal side link, to transmit the call data packet.

Specifically, the host forwards a downlink call data packet sent by the network side device to the extension for playing, and sends an uplink call data packet collected by the extension to the network side device. For details, refer to a schematic diagram of call data packet transmission shown in FIG. 9.

Figure 9:
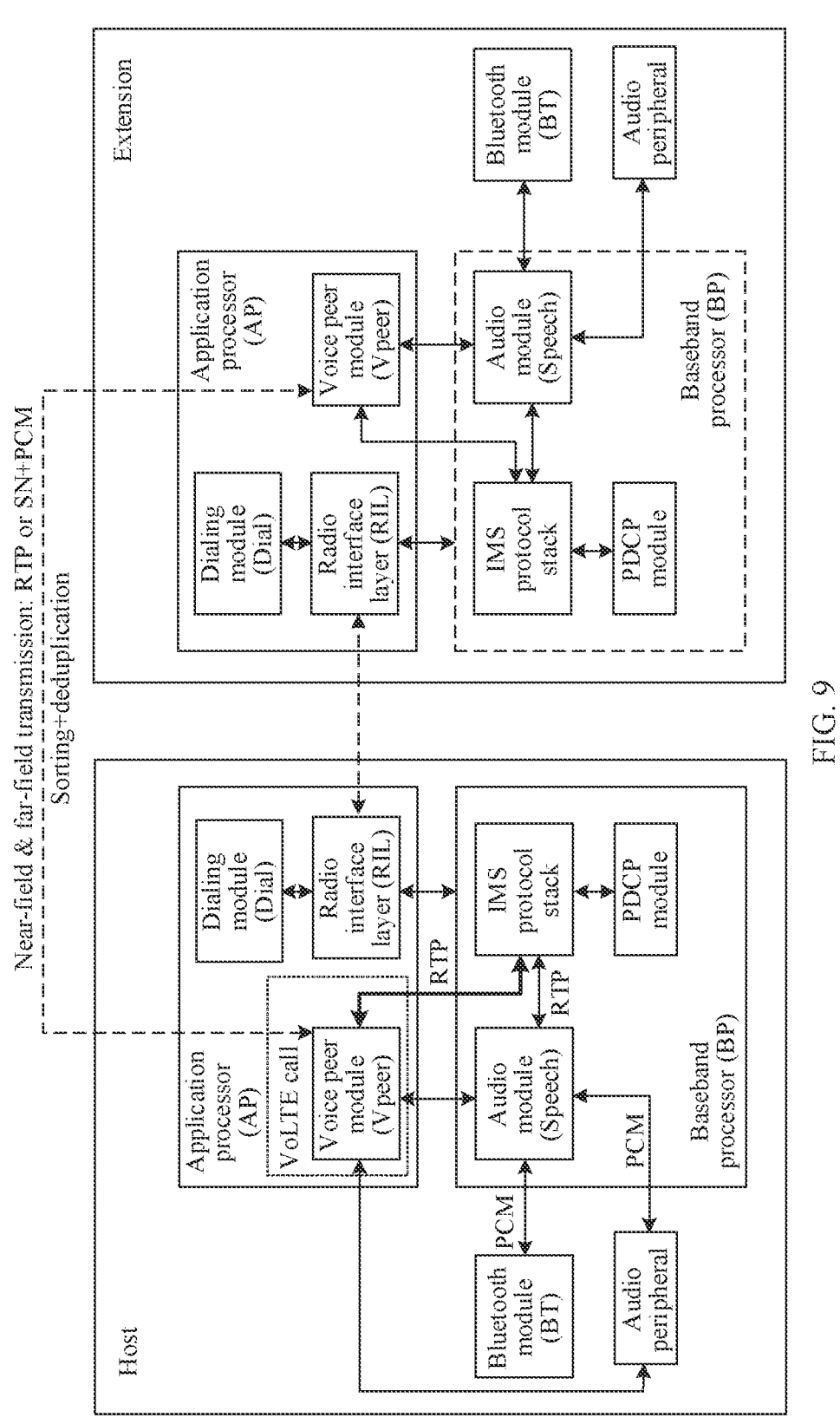
FIG. 9 is a schematic diagram of a connection between a host and an extension according to an embodiment of this application.

Refer to FIG. 9. Both a host and an extension include an application processor (application processor, AP), a baseband processor (baseband processor, BP), a Bluetooth module, and an audio peripheral (for example, a microphone and a speaker). Optionally, when the extension is an electronic device such as a smart sound box or a smart television, the extension may not include the baseband processor.

The application processor includes a dialing module (Dial), a radio interface layer (radio interface layer, RIL), and a voice over long-term evolution (Voice over Long-Term Evolution, VoLTE) call module, and the VoLTE call module includes a voice peer (voice peer, Vpeer) module. The baseband processor includes an audio module (Speech), in IMS protocol stack, and a packet data convergence protocol (Packet Data Convergence Protocol, PDCP) module.

In a call process, a call data packet is transmitted between a base station and the host based on a real-time transport protocol (real-time transport protocol, RTP). After receiving a downlink call data packet sent by a network side device, the baseband processor of the host sends the downlink call data packet to the PDCP module for processing, and the PDCP module sends a processed downlink call data packet to the IMS protocol stack of the host. After performing deduplication and sorting on the downlink call data packet, the IMS protocol stack of the host may send the downlink call data packet to a Vpeer of the extension through a Vpeer of the host, or send the downlink call data packet to a RIL of the extension through a RIL of the host. After receiving the downlink call data packet, the extension deduplicates and sorts the downlink call data packet, processes the downlink call data packet into a pulse code modulation (pulse code modulation, PCM) data stream by using the audio module, and sends the pulse code modulation data stream to the audio peripheral for playing.

After the audio peripheral of the extension collects the uplink PCM data stream, the audio module converts the uplink PCM data stream into an uplink call data packet in an RTP form. Subsequently, the uplink call data packet is sent to the Vpeer of the host through the Vpeer of the extension, or the uplink call data packet is sent to the RIL of the host through the RIL of the extension. After receiving the uplink call data packet, the host sends the uplink call data packet to the network side device by using the baseband processor.

The Vpeer is used to process and transmit voice data. In addition to voice data, the RIL can also transmit other data such as signaling. In a process of transmitting data through the Vpeer or the RIL, the host and the extension may establish a Socket connection based on the IP protocol to transmit the data, or may invoke Bluetooth or Wi-Fi to transmit the data.

In addition, in some embodiments, the extension may not have an RIP data packet parsing function. Therefore, the host may parse a downlink call data packet in an RTP form into the PCM data stream, add a sequence number (sequence number, SN) to the PCNM data stream, and send the PCM data stream to the extension for playing. In addition, after collecting the uplink PCM data stream, the extension can add sequence numbers to different segments of PCM data streams and send the PCM data streams to the host. After receiving the PCM data stream, the host converts the PCM data stream into an uplink call data packet in an RTP form based on the sequence number, and sends the uplink call data packet to the network side device.

S603. The host/extension determines call quality of the extension based on the first terminal side link.

In this embodiment, the call quality of the extension refers to call quality of the terminal side link from the host to the extension. There may be one or more terminal side links. When there are the plurality of terminal side links, the call quality of the extension refers to a comprehensive result of call quality of a plurality of communication links. In S603, because the communication link between the host and the extension is the first terminal side link, the call quality of the extension is current call quality of the first terminal side link.

The call quality includes uplink call quality and/or downlink call quality. The uplink/downlink call quality includes data transmission quality and/or link quality. The data transmission quality may be determined based on a parameter such as a packet loss rate, a latency, or jitter of a call data packet on the communication link. The link quality may be determined based on at least one of reference signal received power (reference signal receiving power, RSRP), reference signal received quality (reference signal receiving quality, RSRQ), or a signal to interference plus noise ratio (signal to interference plus noise ratio, SINR).

S604. The host and the extension establish a second terminal side link based on the call quality of the extension.

When the user makes a call by using the extension, the user may be gradually away from the host. Consequently, the terminal side link is abnormal, and the call quality of the extension deteriorates. Therefore, the host and the extension may further establish at least one second terminal side link based on the call quality of the extension to transmit the call data packet, to improve the call quality between the host and the extension.

In some embodiments, when the call quality of the extension is lower than a preset value, voice quality deteriorates, resulting in phenomena, such as discontinuity and silence that can be perceived by the user, and poor user experience. Therefore, the second terminal side link is established between the host and the extension, to improve the call quality. For example, when a packet loss rate of the first terminal side link is greater than the preset value (for example, 10%), or a latency of the call data packet is greater than the preset value (for example, 120 ms), or a signal-to-noise ratio of the first terminal side link is lower than the preset value (for example, 10 decibels), the host and the extension establish the second terminal side link.

In some other embodiments, the host/extension may continuously detect the call quality of the extension. When the call quality of the extension continuously decreases within a preset time period, it indicates that the extension may be gradually away from the host. This causes the call quality of the extension to gradually deteriorate. To avoid sudden discontinuity or interruption of a call on an extension side, the host and the extension establish the second terminal side link. For example, within 3 s, if the packet loss rate of the first communication link increases by more than 2% per second, the host and the extension establish the second terminal side link. Alternatively, within 3 s, if a latency of the first communication link increases by more than 50 ms per second, the host and the extension establish the second terminal side link.

Optionally, for a scenario of a voice call or a video call, when the call quality of the extension is lower than the preset value, or when the call quality of the extension continuously decreases within the preset time period, the extension side may play a prompt voice to indicate that the current call quality gradually decreases, to remind the user of approaching the host. For example, the prompt voice may be an urgent "beep ~" sound, or voice information: "The signal of the extension is weak. Please approach the host." In addition, for the scenario of a video call, prompt information may be further displayed on a call interface of the extension. For example, the prompt information may be text information: "The signal of the extension is weak. Please approach the host."

It should be noted that the second terminal side link is different from the first terminal side link. For example, when the first terminal side link is a Bluetooth link, the second terminal side link is a Wi-Fi link or a data service link. Alternatively, when the first terminal side link is the Wi-Fi link, the second terminal side link is the Bluetooth link or the data service link. Alternatively, when the first terminal side link is the data service link, the second terminal side link is the Bluetooth link or the Wi-Fi link.

In this embodiment, there may be one or more second terminal side links. In a process of establishing the second terminal side link, because the first communication link is not disconnected, the host and the extension may negotiate through the first terminal side link, to establish the second terminal side link.

In addition, in some other embodiments, the host and the extension may also establish a plurality of terminal side links in advance, for example, establish the first terminal side link and the second terminal side link in advance. In a call process, one or more terminal side links are selected to transmit call data based on the call quality.

S605. The host and the extension transmit the call data packet through the first terminal side link and the second terminal side link.

In some embodiments, after the host and the extension just establish the second terminal side link, the first terminal side link is generally not disconnected. Therefore, the host and the extension may jointly transmit the call data packet through the first terminal side link and the second terminal side link.

In a process in which the host and the extension jointly transmit the call data packet through the first terminal side link and the second terminal side link, a part of call data packets may be transmitted through the first terminal side link, and the other part of call data packets may be transmitted through the second terminal side link, to reduce data transmission pressure of each terminal side link and improve transmission quality of the call data packet. Alternatively, all the call data packets may be duplicated, and all the call data packets are transmitted once on both the first terminal side link and the second terminal side link, to reduce a quantity of missed call data packets at a receiving end, and improve the call quality.

In a process in which the host and the extension jointly transmit the call data packet through the first terminal side link and the second terminal side link, the host/extension may continuously determine first call quality of the first terminal side link and second call quality of the second terminal side link. If the first call quality becomes worse, the extension and the host may gradually transfer the call data packet from the first terminal side link to the second terminal side link for transmission. According to the method, the communication link can be smoothly switched, so that the user is unaware of the switching. Even if the first terminal side link is disconnected, the extension can still continue to perform the call, and user experience is good.

In some other embodiments, after the host and the extension establish the second terminal side link, the host may also continuously determine the first call quality of the first terminal side link and the second call quality of the second terminal side link. Then, the terminal side link having high call quality is retained, and the another terminal side link is automatically disconnected, to reduce power consumption of the host and the extension.

For example, when the first call quality is higher than the second call quality, the first terminal side link is retained, and the second terminal side link is disconnected. Alternatively, when the first call quality is higher than the second call quality and is higher than a quality threshold (for example, −95 dBm), the first terminal side link is retained, and the second terminal side link is disconnected. Alternatively, when the second call quality is higher than the first call quality, the second terminal side link is retained, and the first terminal side link is disconnected. Alternatively, when the second call quality is higher than the first call quality and is higher than the quality threshold, the second terminal side link is retained, and the first terminal side link is disconnected.

Alternatively, when the first call quality is lower than a quality threshold 1 (for example, −95 dBm), and the second call quality is higher than a quality threshold 2 (for example, −80 dBm), the host or the extension disconnects the first terminal side link. When the second call quality is lower than the quality threshold 1 (for example, −95 dBm), and the first call quality is higher than the quality threshold 2 (for example, −80 dBm), the host or the extension disconnects the second terminal side link. The quality threshold 2 is greater than the quality threshold 1.

Alternatively, when the first call quality is close to the second call quality, the host may disconnect one data service link in the first terminal side link and the second terminal side link, to reduce consumption of cellular data traffic.

In a process of transmitting the call data packet between the host and the extension, due to causes such as network congestion and poor link quality, after receiving the call data packet, the extension needs to first perform post-processing on the call data packet and then play the call data packet.

In an example, a jitter buffer (jitter buffer, JB) may be disposed in the extension, and is configured to perform post-processing on the received call data packet, for example, anti-jitter, deduplication, and sorting. Specifically, the JB arranges received out-of-order call data packets and places the call data packets in corresponding positions in the buffer, and places and buffers the received call data packets in the buffer for a preset time period, and then sends the received call data packets to an audio peripheral for playing, so that audio is played more smoothly, to obtain better audio quality.

Optionally, when the call quality of the extension is lower than the preset value, the extension may increase a size of the JB, and increase a buffering time period of the call data packet in the JB, to hold a delayed call data packet, to improve the call quality.

In addition, if the call quality of the extension cannot be improved after the host and the extension establish the second terminal side link, a third terminal side link may be further established between the host and the extension. For a process of establishing the third terminal side link, refer to the process of establishing the second terminal side link in S603. Details are not described herein in this embodiment. It should be noted that the first terminal side link, the second terminal side link, and the third terminal side link are all different. For example, when the first terminal side link is the Bluetooth link, the second terminal side link is the Wi-Fi link, and the third terminal side link is the data service link.

According to the call method provided in this embodiment of this application, in a process in which the user makes a call by using the extension, when terminal side call quality is poor, the host and the extension may establish a new terminal side link to transmit the call data packet, to improve the call quality of the extension and improve user experience. After that, the call of the extension is not affected even if an original terminal side link is disconnected.

In addition, when the user uses the extension to make a call, the user can adjust a coding rate to improve the call quality of the extension. The coding rate includes an audio coding rate and/or a video coding rate.

For example, when the call quality of the extension is lower than the preset value, the extension lowers an uplink audio coding rate and/or a video coding rate, to reduce a quantity of uplink call data packets. In addition, the host may further lower a coding rate of the downlink call data, packet, and reduce a quantity of downlink call data packets transmitted by the host to the extension. After the quantity of call data packets on the terminal side link is reduced, a packet loss rate, jitter, and a latency of the terminal side link are improved to some extent, and call smoothness can be improved.

For another example, when the call quality of the extension is lower than the preset value, the extension may notify the host that the call quality of the extension is low, and the host requests the network side device to lower the downlink audio coding rate and/or the video coding rate, to reduce the quantity of downlink call data packets, reduce the quantity of call data packets on the terminal side link, and improve call smoothness.

Alternatively, the host may further detect call quality of the host, to be specific, call quality of the network side link between the host and the network side link. When the call quality of the host is lower than the preset value, the host may notify the network side device of lowering the coding rate of the downlink call data packet, and notify the extension of lowering the coding rate of the uplink call data packet, to reduce data of the call data packet transmitted on the network side link, improve the call quality of the host, and further improve call smoothness.

In addition, in this embodiment, in a process in which the host and the extension perform an audio call, a format of audio transmitted between the host and the extension may be further determined based on the call quality of the extension. For example, when the call quality of the extension is lower than the preset value, a format of audio having high coding quality is changed to a format of audio having low coding quality. When audio information is transmitted on the terminal side link according to the method, parameters such as a packet loss, jitter, and a latency can be reduced, and the call quality of the extension can be improved.

In this embodiment, the format of the audio includes PCM, Opus, an adaptive multi rate-narrow band (adaptive multi rate-narrow band, AMR-NB), an adaptive multi rate-wide band (adaptive multi rate-narrow band, AMR-WB), an enhance voice service (enhance voice service, EVS), or the like. Formats of the audio such as the PCM, the AMR-WB, and the EVS have a high coding rate, and formats of the audio such as the Opus and the AMR-NB have a low coding rate. In an example, when the call quality of the extension is lower than the preset value, the extension may convert the PCM data stream for collecting uplink audio information into an Opus format, and then send audio information in an Opus format Opus format to the host. Audio information in the Opus format is small in size, which reduces parameters such as a packet loss, jitter, and a latency during transmission and improves the call quality of the extension.

In addition, in a process in which the host and the extension perform the voice call, re-sampling may be further performed, based on the call quality of the extension, on audio information to be transmitted on the terminal side link. In this embodiment, re-sampling refers to extracting a part of audio information from original audio information at a sampling rate lower than a sampling rate of the original audio information, which may reduce a volume of the original audio information. In this embodiment, for example, when the call quality of the extension is lower than the preset value, the host may re-sample downlink audio data sent by the network side device and send re-sampled downlink audio data to the extension; and/or when the call quality of the extension is lower than the preset value, the extension may also re-sample locally collected uplink audio data and send re-sampled uplink audio data to the host.

In addition, in a process of transmitting the call data packet between the host and the extension through the local area network, a priority identifier may be added to an Ethernet header of the call data packet, so that the router preferentially forwards the call data packet, to improve the call quality of the extension. Alternatively, the router may be configured in advance, and the router preferentially forwards communication data to an electronic device in the local area network, and then forwards the communication data to an electronic device in a public network, to achieve an objective of preferentially forwarding the call data packet to the extension or the host, and improve the call quality of the extension.

Based on the device network provided in the foregoing embodiments of this application, after receiving the incoming call, the host may further perform operations such as intelligent incoming call reminding, incoming call reminding conflict processing, an extension conference, call transfer a (single-card/dual-card) dual-link call, audio and video separation processing, audio/video collection and play in the extension, and duplication/transfer of an overall communication service of the host to the extension. The following separately describes in detail.

(1) Intelligent Incoming Call Reminding

Figures 10, 11:
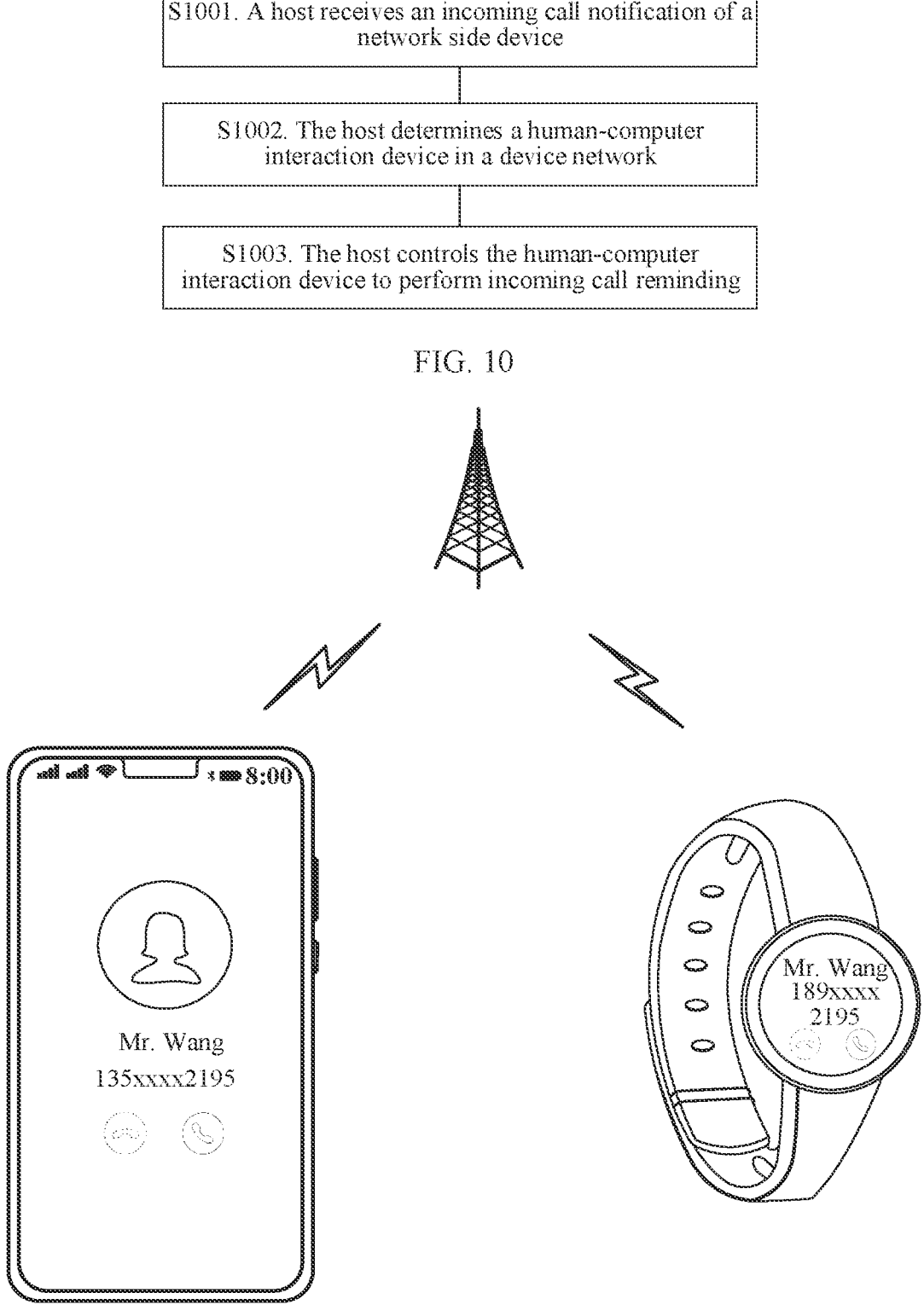
FIG. 10 is a flowchart of an incoming call reminding method according to an embodiment of this application.
FIG. 11 is a schematic diagram 2 of a call scenario according to an embodiment of this application.

FIG. 10 is a flowchart of an incoming call reminding method according to an embodiment of this application, and relates to a process in which a host notifies an electronic device having human-computer interaction in a device network to perform incoming call reminding.

S1001. The host receives an incoming call notification of a network side device.

S1002. The host determines a human-computer interaction device in the device network.

In some embodiments, after receiving the incoming call notification, the host may send a query message to an electronic device having an audio play and collection function in the device network. The query message is used to query whether a human-computer interaction operation exists in the corresponding electronic device within a preset time period (for example, 3 s). The electronic device having the audio play and collection function may be a mobile phone, a tablet computer, a smart watch, or the like. The human-computer interaction operation includes: A user touches a screen of the electronic device, controls the electronic device by using audio, controls the electronic device by using a gesture, controls the electronic device by using a mouse, a keyboard, and a remote management, detects a pulse and a heart rate of the user by using the electronic device, and moves the electronic device with the user. After receiving the query message, if the human-computer interaction operation exists in the electronic device, the electronic device sends a human-computer interaction notification to the host, to indicate that the human-computer interaction operation exists in the electronic device.

In some other embodiments, after detecting the human-computer interaction operation, each electronic device having the audio play and collection function sends the human-computer interaction notification to another electronic device (for example, a mobile phone or a smart watch) having a cellular call function in the device network. After receiving the incoming call notification and becoming the host, the electronic device determines the human-computer interaction device based on the human-computer interaction notification reported by the electronic device.

Optionally, in the foregoing embodiment, electronic devices in the device network generally belong to a same owner. Therefore, when detecting the human-computer interaction operation, the electronic device may identify whether the current user is the owner. For example, the electronic device may collect a face image of the user, and compare the face image with a locally stored owner image, to determine whether the user is the owner. If the user is the owner, the human-computer interaction notification is sent to the electronic device having the cellular call function.

S1003, The host controls the human-computer interaction device to perform incoming call reminding.

Specifically, the host may send the incoming call notification to an extension by using the device network. The extension performs incoming call reminding based on the incoming call notification. In this embodiment, an incoming call reminding manner may be at least one of displaying an incoming call interface, ringing (also referred to as playing an incoming call prompt), vibration, or the like.

According to the incoming call reminding method provided in this embodiment, after receiving an incoming call from the network side device, the host may display the incoming call interface on an electronic device that is being operated by the user, so that the user answers or declines the call, to have better user experience. For example, when the user has a mobile phone, a tablet computer, and a notebook computer at the same time, in a process of using the tablet computer, the user may be far away from the mobile phone, and it is inconvenient to answer an incoming call of the mobile phone: or the user is operating the notebook computer, and it is inconvenient to operate the mobile phone to answer an incoming call. Therefore, according to a call method provided in this embodiment, based on the device network including the mobile phone, the tablet computer, and the notebook computer, the mobile phone may control the tablet computer/notebook computer to perform incoming call reminding, and the user may answer the incoming call of the mobile phone by using the tablet computer/notebook computer.

After the host receives the incoming call notification, if no human-computer interaction device is detected in the device network, the host controls an electronic device having an audio or video processing function in the device network to perform incoming call reminding in a preset sequence. Alternatively, after receiving the incoming call notification, the host may directly control the electronic device having the audio or video processing function in the device network to perform incoming call reminding in the preset sequence. In a process in which each electronic device performs incoming call reminding, the user may answer the call by using the electronic device. Details are as follows.

In a possible implementation, the host may classify electronic devices in the device network into different priorities. The electronic devices are controlled in descending order of priorities to perform incoming call reminding. It should be noted that the priority may be set by the host by default, or may be set by the user.

For example, the host may classify the electronic devices in the device network into a first-priority device, a second-priority device, and a third-priority device. Refer to Table 1. The first-priority device may be the host. The second-priority device may be an electronic device that is generally only used by the user, such as a mobile phone or a smart watch. The third-priority device may be an electronic device that is generally used by another user other than the owner, such as a tablet computer, a notebook computer, or a smart television.

TABLE 1

| Incoming call reminding schedule | | | |
| --- | --- | --- | --- |
| Incoming call time | T1 | T2 | Remaining time |
| First-priority device | | | Host |
| Second-priority device | | | Mobile phone, smart watch, or the like |
| Third-priority device | | | Tablet computer, notebook computer, smart TV, or the like |

After receiving the incoming call from the network side device, the host first controls the first-priority device to perform incoming call reminding. After the first-priority device continuously performing reminding for the duration T1, if the phone is still in a call state, the host controls the second-priority electronic device to perform incoming call reminding. In a process in which the second-priority device performs incoming call reminding, the first electronic device may stop performing incoming call reminding, or may perform an incoming call prompt simultaneously with the second-priority electronic device. For example, T1=20 s.

After the second-priority device continuously performs reminding for the duration T2, if the phone is still in a call state, the host controls the third-priority device to perform incoming call reminding. In a process in which the third-priority device performs incoming call reminding, the first-priority device and the second-priority device may perform incoming call reminding or may not perform incoming call reminding. For example, T2=15 s.

It should be noted that, the priority of the electronic device in the device network is not limited to the content shown in Table 1. The user may further set the priority of each electronic device in the device network and the duration of T1 and T2 by using the host.

In addition, in the device network, if a power level of the electronic device is lower than a preset value (for example, 20% of a total power level), the electronic device may notify another electronic device that the electronic device is in a low power state. Based on this, in some embodiments, after the host receives an incoming call, the host may preferentially send the incoming call notification to another electronic device in the device network, and then send the incoming call notification to the electronic device in a low power state. In some other embodiments, after the host receives an incoming call, the host may not send the incoming call notification to the electronic device in a low power state, and does not control the electronic device in a low power state to perform incoming call reminding.

According to the incoming call reminding method provided in this embodiment, after receiving the incoming call from the network side device, the host may control the electronic devices in the device network to ring sequentially in a specific sequence, and the user may choose to answer the call in an electronic device closest to the user or an electronic device that the user wants to use.

In addition, the electronic device may further enable an identity answer function, to be specific, after obtaining a call answer instruction of the user, the electronic device identifies whether the user is the owner of the electronic device. If the user is the owner, the electronic device responds to an answer operation performed by the user, and answers the call. If the user is not the owner, the electronic device does not respond to the answer operation performed by the user. Optionally, the electronic device may determine, by identifying biometric feature information such as a facial feature, a fingerprint, and a voice print of the user, whether the user is the owner.

(2) Incoming Call Reminding Conflict Processing

After a one-number multi-terminal service is enabled for a phone number, a plurality of electronic devices may share the phone number to communicate with a network side device, and perform various cellular communication services, for example, making a call, receiving and sending a message, and using cellular data. In this embodiment, the electronic devices that use the same phone number to communicate with the network side device are referred to as same-number devices.

For a call service, an incoming call reminding policy set by the network side device for the plurality of same-number devices is generally simultaneous ringing. For example, the same-number devices are a mobile phone and a smart watch. Refer to FIG. 11. When an electronic device calls the phone number, the network side device separately notifies the mobile phone and the smart watch of an incoming call, and both the mobile phone and the smart watch perform incoming call reminding. A user may answer/decline the call on the mobile phone, or may answer/decline the call on the smart watch.

Figure 12:
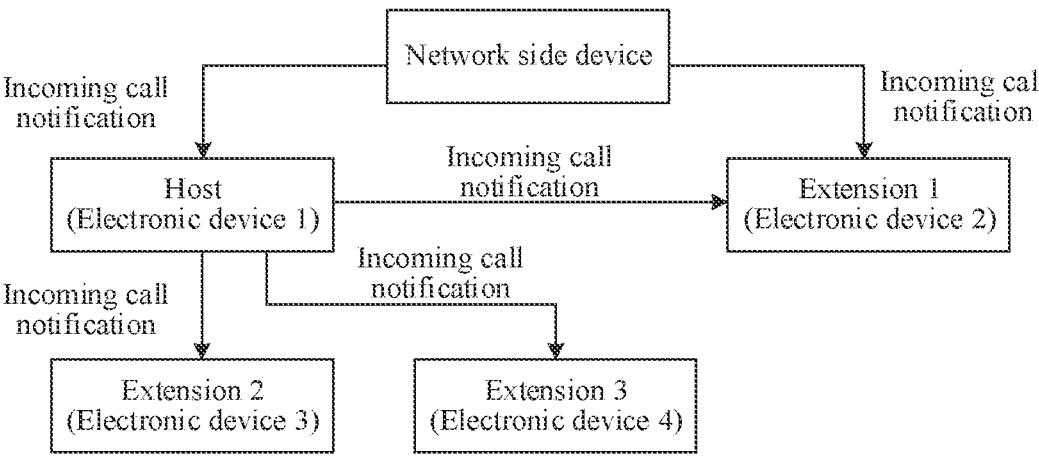
FIG. 12 is a schematic diagram of delivering an incoming call notification according to an embodiment of this application.

In this embodiment, for the plurality of same-number devices in a device network, the user may preset one same-number device as a host of the incoming call, and set another same-number device an as extension of the incoming call. For example, as shown in FIG. 12, for same-number devices: an electronic device 1 and an electronic device 2, a phone number corresponding to the electronic device 1 and the electronic device 2 is a number A. After connecting the electronic device 1 and the electronic device 2 to the device network, the user may preset the electronic device 1 as the host when the incoming call occurs, and set the electronic device 2 as the extension when the incoming call occurs. When a network side calls the number A, according to the incoming call reminding policy on a network side, the electronic device 1 and the electronic device 2 separately receive an incoming call notification sent by the network side device, and perform incoming call reminding together. However, according to the incoming call notification policy on a terminal side, after receiving the incoming call notification, the electronic device 1 serving as the host further needs to send the incoming call notification to other electronic devices in the device network, for example, the electronic device 2, an electronic device 3, and an electronic device 4. That is, the electronic device 2 receives the two incoming call notifications. Because the electronic device performs incoming call reminding based on the incoming call notification, an incoming call reminding conflict may occur on the electronic device 2. Therefore, the electronic device in the device network needs to perform incoming call reminding conflict processing.

Figure 13:
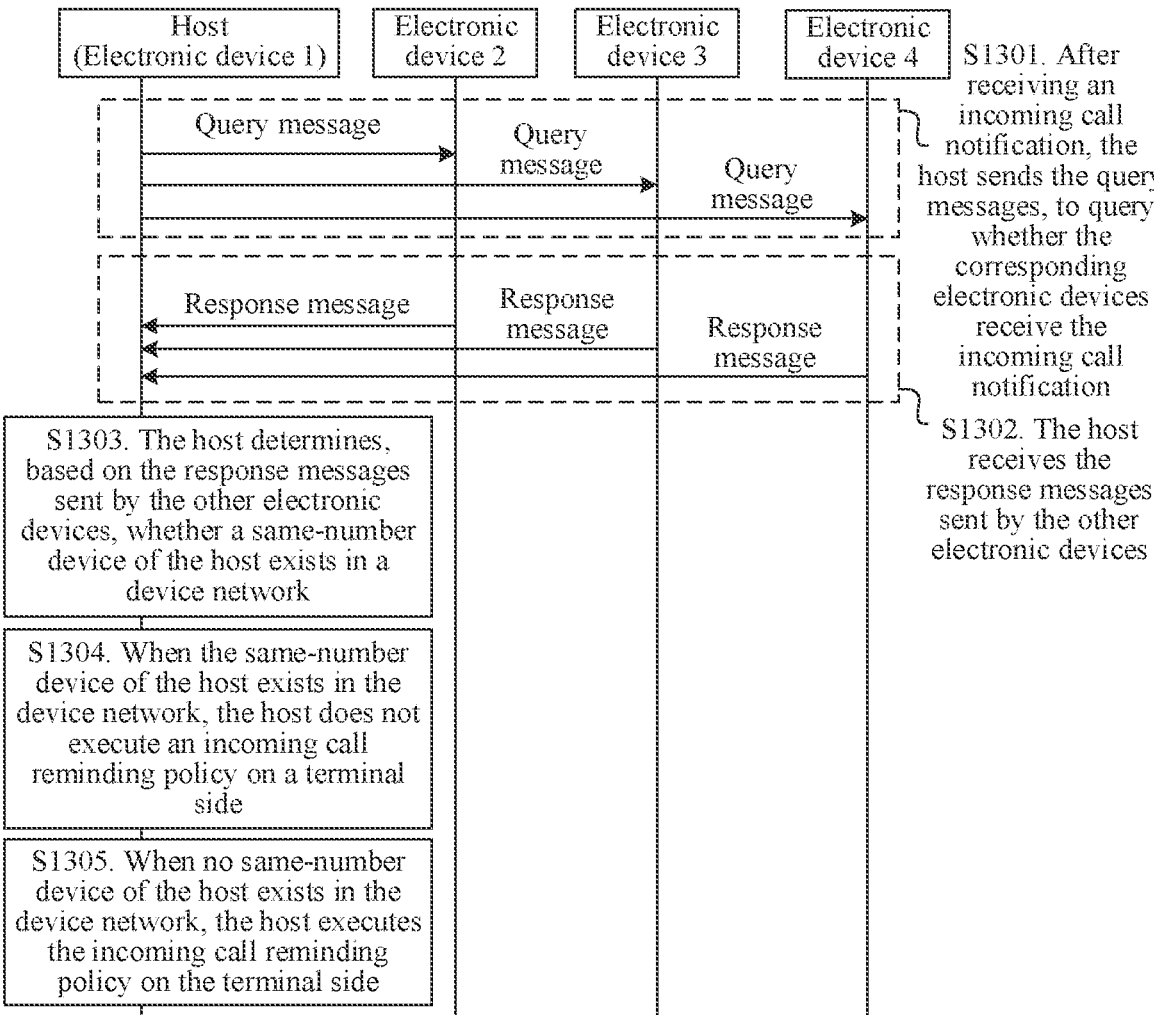
FIG. 13 is a flowchart of an incoming call reminding conflict processing method according to an embodiment of this application.

FIG. 13 is a flowchart of an incoming call reminding conflict processing method according to an embodiment of this application, and relates to content of disabling an incoming call reminding policy on a terminal side by a host when detecting an incoming call of a same-number device in a device network.

S1301. After receiving an incoming call notification, the host sends a query message to another electronic device in the device network, where the query message is used to query whether the corresponding electronic device receives the incoming call notification.

S1302. The host receives a response message sent by the another electronic device, where the response message indicates whether the corresponding electronic device receives the incoming call notification.

In this application, the host may determine a status of an extension in manners of query, subscription, and active reporting by the extension, for example, determine whether the extension receives the incoming call notification, whether a power level is lower than a power level threshold, and whether a human-machine interaction operation exists. In a query mode of the host, each time the extension receives one query information, the extension sends one corresponding response message to the host or another extension. In this embodiment, S1301 and S1302 show a process in which the host queries whether the extension receives the incoming call notification. In a subscription mode of the host, after an event that the host subscribes to from the extension occurs, the extension reports the event to the host. For example, after receiving the incoming call notification, the extension actively notifies the host, In an active reporting mode of the extension, the extension actively notifies the host at a preset interval or under a preset condition. For example, after receiving the incoming call notification, the extension actively notifies the host.

S1303. The host determines, based on the response message sent by the another electronic device, whether the same-number device of the host exists in the device network.

Before the host receives the incoming call notification and executes the incoming call reminding policy on the terminal side, in the another electronic device in the device network, only the same-number device of the host receives the incoming call notification from the network side device. Therefore, the host may determine, by querying whether the another electronic device in the device network receives the incoming call notification, whether the same-number device of the host exists in the device network.

In addition, in some other embodiments, different from S1301 to S1303, an option may be set in the host, so that a user actively notifies the host of whether the same-number device of the host exists in the device network. The host can determine whether the same-number device of the host exists in the device network based on the preset setting of the user.

S1304, When the same-number device of the host exists in the device network, the host does not execute the incoming call reminding policy on the terminal side.

In S1304, the same-number device of the host can be avoided from receiving the two same incoming call notifications, namely, the incoming call notification sent by the network side device and the incoming call notification sent by the host to avoid a case in which an incoming call reminding conflict occurs.

S1305. When no same-number device of the host exists in the device network, the host executes the incoming call reminding policy on the terminal side.

According to the method provided in this embodiment, when the same-number device in the device network receives the incoming call, a case in which the same-number device of the host in the device network receives a plurality of same incoming call notifications can be avoided, and the incoming call reminding conflict can be avoided.

In addition, the host may also execute both an incoming call reminding policy on a network side and the incoming call reminding policy on the terminal side. In this case, the extension (including the same-number device of the host) in the device network needs to perform deduplication processing on the incoming call notifications, and then perform incoming call reminding. Details are as follows.

In some embodiments, the extension (for example, the electronic device 2, the electronic device 3, or the electronic device 4 in FIG. 12) may perform incoming call reminding based on a first received incoming call notification 1, and ignore, in an incoming call reminding process, another incoming call notification that is the same as the incoming call notification 1, to avoid the incoming call reminding conflict.

In this embodiment, after receiving the incoming call notification, the host may immediately send the incoming call notification to the extension, so that the extension can quickly perform incoming call reminding. Alternatively, the host may delay a preset time period (for example, 2 s) and send the incoming call notification to the extension, so that the extension preferentially receives the incoming call notification from the network side device, and then performs incoming call reminding based on the incoming call notification from the network side device.

In some other embodiments, after receiving the incoming call notification 1, the extension (for example, the electronic device 2, the electronic device 3, or the electronic device 4 in FIG. 12) holds for a preset time period (for example, 2 s). After the preset time period, if the extension does not receive the another incoming call notification that is the same as the incoming call notification 1, the extension performs incoming call reminding based on the incoming call notification 1. If the host receives the another incoming call notification that is the same as the incoming call notification 1, the host preferentially performs, based on a preset setting and the incoming call notification sent by a network side, incoming call reminding, or preferentially performs incoming call reminding based on the incoming call notification sent by the host.

It should be noted that, if the extension performs incoming call reminding based on the incoming call notification sent by the network side device, after the user answers the call on the extension, the extension directly communicates with the network side device to transmit a call data packet.

If the extension performs incoming call reminding based on the incoming call notification sent by the host, after the user answers the call on an extension side, the host relays the call data packet between the network side device and the extension.

According to the call method provided in this embodiment of this application, after receiving the plurality of same incoming call notifications, the electronic device may perform incoming call reminding based on only one of the incoming call notifications, to avoid the incoming call reminding conflict, (3) Extension Conference With the development of communication technology, a teleconference is more and more widely used in work and life. Therefore, based on the device network provided in this application, an embodiment of this application further provides a method for performing an extension conference in a call process.

Figures 14A, 14B:
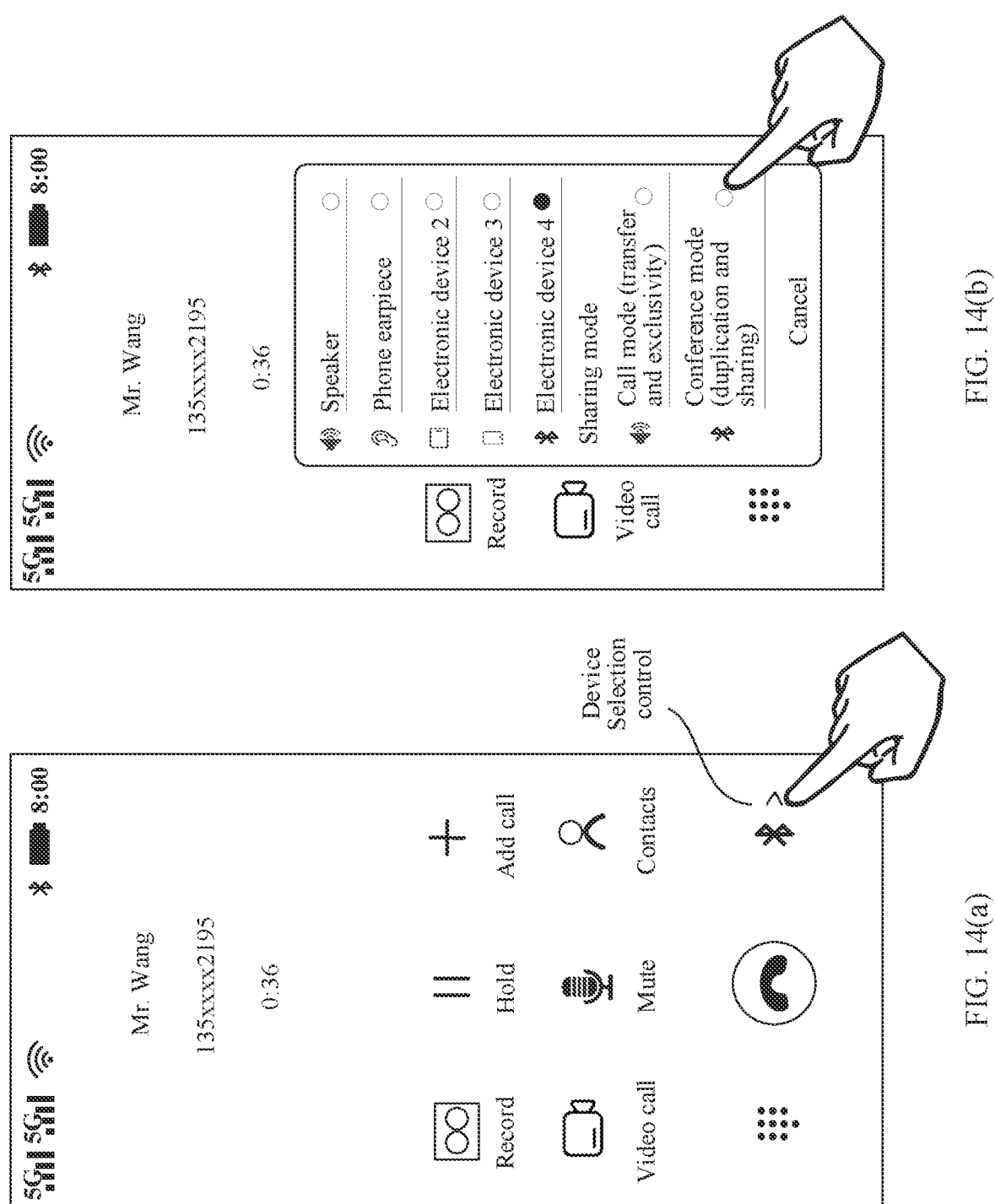
FIG. 14(a) to FIG. 14(c) are a schematic diagram 1 of an interface of an electronic device according to an embodiment of this application.
Figure 14C:
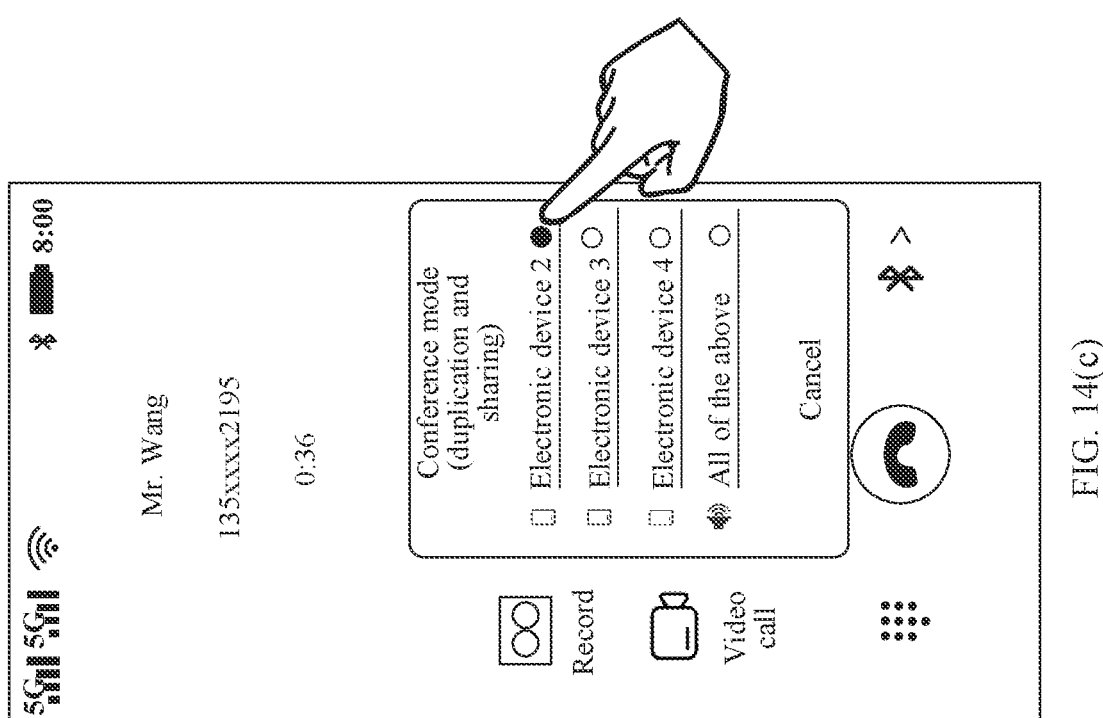

Refer to FIG. 14(*a*). A call interface of an electronic device includes incoming call information, call duration, a function menu, a call decline icon, a device selection control, and the like. The electronic device may be a host or an extension, and the incoming call information includes an incoming call number and/or an incoming call user name, for example. "135xxxx2195" and/or "Mr. Wang". The function menu may include a "Record" option, a "Hold" option, an "Add call" option, a "Video call" option, a "Mute" option, a "Contacts" option, and the like. The device selection control is used to select an audio and video processing device for a current call.

Refer to FIG. 14(*b*). After detecting an operation performed by a user on the device selection control, the electronic device nay display a device selection box, where the device selection box includes a "Phone mode" option and a "Conference mode" option. In response to an operation performed by the user on the "Conference mode" option, the electronic device may duplicate and share the current call to each electronic device in the device network in which the electronic device is located. An electronic device 1 is used as an example. In response to the operation performed by the user on the "Conference mode" option, the electronic device 1 may simultaneously duplicate and share the current call to an electronic device 2, an electronic device 3, and an electronic device 4.

Alternatively, refer to FIG. 14(*c*). In response to the operation performed by the user on the "Conference mode" option, the electronic device may display all available electronic devices in the device network, for example, "Electronic device 2", "Electronic device 3", or "Electronic device 4". The user may select one or more electronic devices from the available electronic devices, and duplicate and share the current call to the electronic device, for example, the electronic device 2.

After receiving the call that is duplicated and shared by the electronic device, the another electronic device may automatically join the call, or may display a prompt box, to query the user whether to join the shared call. An example of a tablet computer is used. After receiving the call duplicated and shared by the electronic device, the tablet computer may display a prompt box shown in FIG. 15. The prompt box includes prompt information: "A call shared by my phone from 'Mr, Wang 135xxxx2195'", an "Answer" control, and a "Decline" control. The user can choose whether to join the call based on a requirement of the user.

In the device network, after a plurality of electronic devices join the current call by using "Conference mode", the host sends, based on the device network, a call data packet to each electronic device that joins a conference.

In some embodiments, a participant generally only needs to listen to the conference, and does not need to speak during the conference. Based on this, refer to FIG. 16*a*. In a conference process, the host sends a downlink call data packet (including audio and/or a video) received from a network side device to each extension (for example, an extension 1, an extension 2, and an extension 3), and each extension plays the downlink call data packet. Each extension does not collect audio and video information of the user.

In some other embodiments, a participant in the conference needs to listen to the conference, and also needs to speak during the conference. Based on this, refer to FIG. 16*b*. In the conference process, the host sends a downlink call data packet (including audio and/or a video) received from the network side device to each extension (for example, an extension 1, an extension 2, and an extension 3), and each extension plays the downlink call data packet. In addition, each extension further collects audio information of a user of each extension, and sends the audio information to the host by using an uplink call data packet. After receiving the uplink call data packet of each extension, the host performs audio mixing on the audio information of each extension based on time stamp of each call data packet, and sends audio information obtained through the audio mixing to the network side device.

(4) Call Transfer

In a process in which electronic devices (including a host and an extension) preform a call, a user may perform an operation on a call device side to transfer a current call to another electronic device, or may perform an operation on a target transfer device side to transfer the current call to this locality, so that the user flexibly selects a call device based on a requirement. The following separately describes the two manners.

Manner 1: Perform an operation to transfer a call on the call device side.

Figures 17A, 17B:
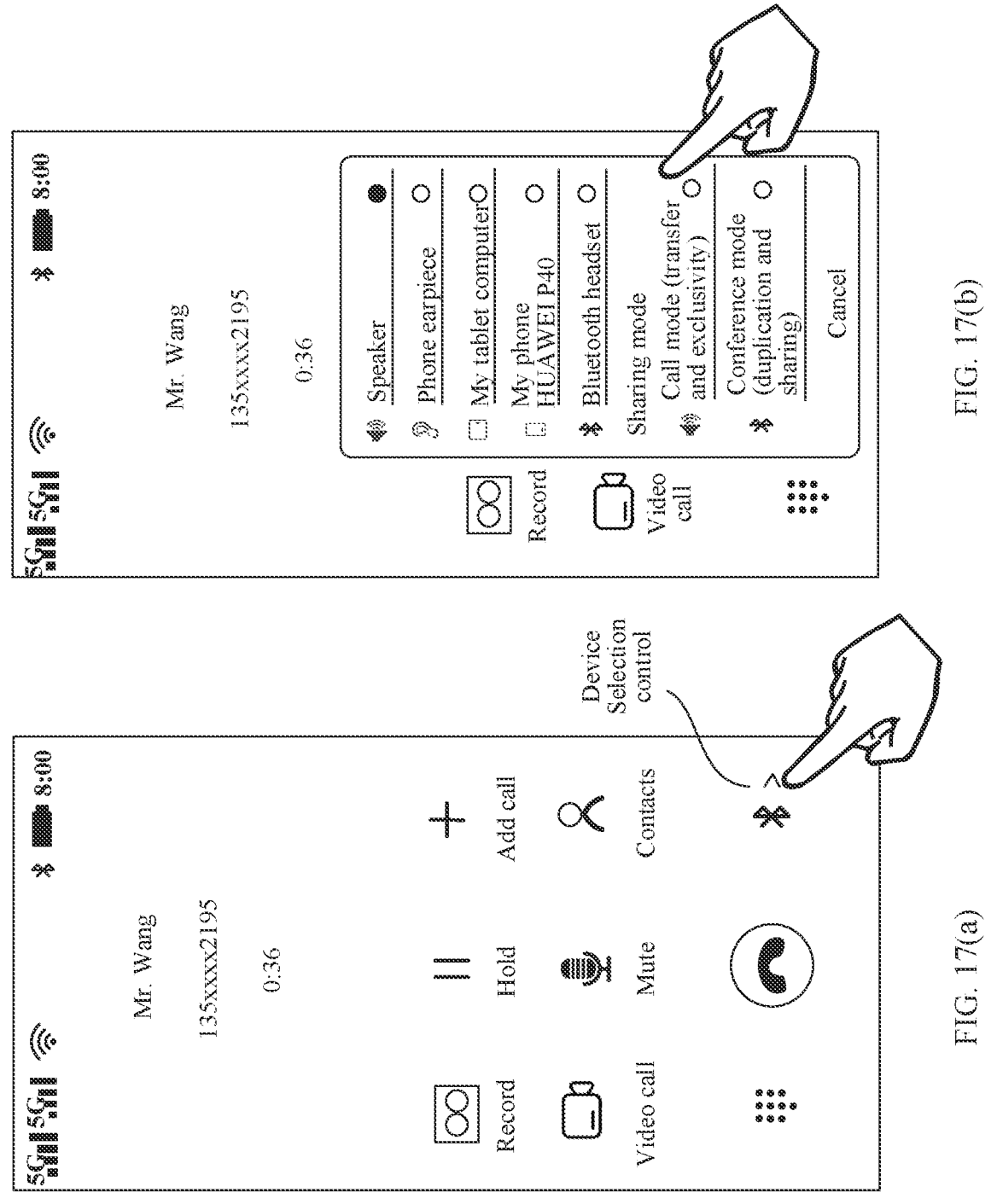
FIG. 17(a) to FIG. 17(c) are a schematic diagram of a call transfer interface according to an embodiment of this application.
Figure 17C:
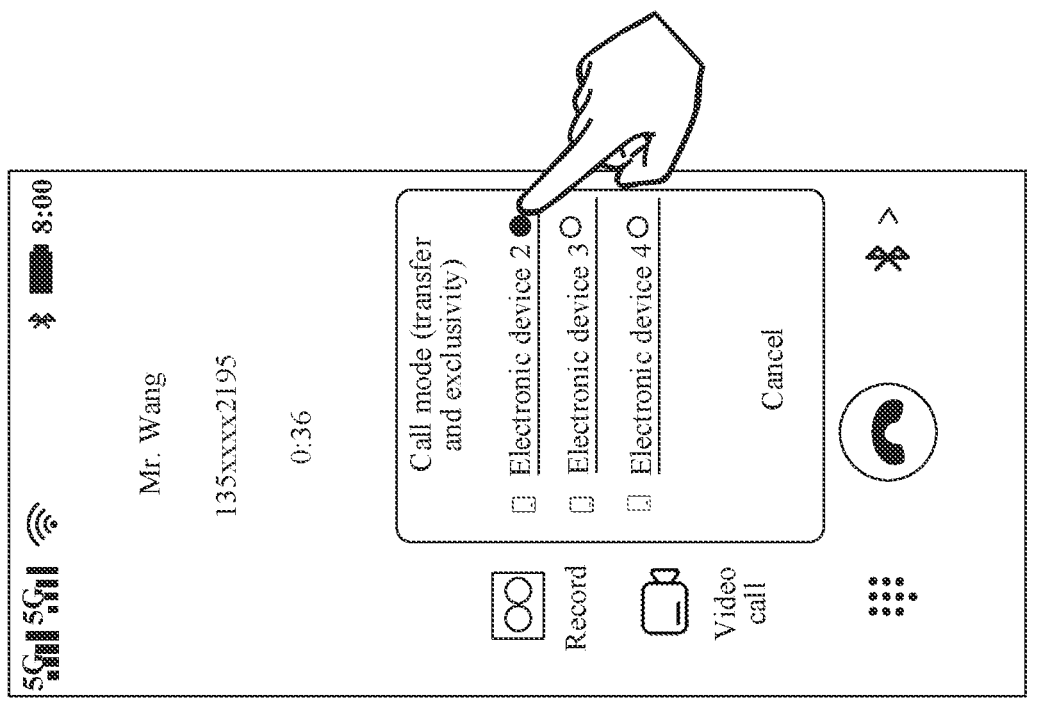

FIG. 17(*a*) to FIG. 17(*c*) are a schematic diagram of a call transfer interface according to an embodiment of this application, and relates to a process in which a user performs an operation on a call device side to transfer a current call. Refer to FIG. 17(*a*). In response to an operation performed by the user on a device selection control in a call interface, an electronic device displays a prompt box shown in FIG. 17(*b*). In response to an operation on a "Phone mode" option in the prompt box, the electronic device displays a device selection box shown in FIG. 17(*c*). The device selection box includes all electronic devices that can be used for the call in a current device network, for example, in electronic device 2, an electronic device 3, and an electronic device 4. The user may select any electronic device from the device selection box as a transfer device of the current call. For example, the user may select the electronic device 2, to transfer the current call to the electronic device 2.

In the foregoing embodiment, if the call device is a host, after transferring the call to another electronic device, the host sends, to the electronic device, a downlink call data packet sent by a network side device, and the electronic device plays the downlink call data packet. In addition, the electronic device sends a collected uplink call data packet to the host, so that the host sends the uplink call data packet to the network side device.

If the call device is an extension 1, after the extension 1 transfers the call to the host, the host directly communicates with the network side device to transmit the uplink/downlink call data packet. If the call device is the extension 1, after the extension 1 transfers the call to an extension 2, the extension 1 may send a call transfer notification to the host, so that the host directly communicates with the extension 2 and transmits the uplink/downlink call data packet; or the host and the extension 2 may communicate with each other by using the extension 1 as a relay and transmit the uplink/downlink call data packet.

According to a call transfer method provided in this embodiment of this application, the user can select the electronic device to make the call based on a requirement of the user, to have good user experience.

Manner 2: Control to transfer a current call to this locality on the target transfer device side.

Figure 18:
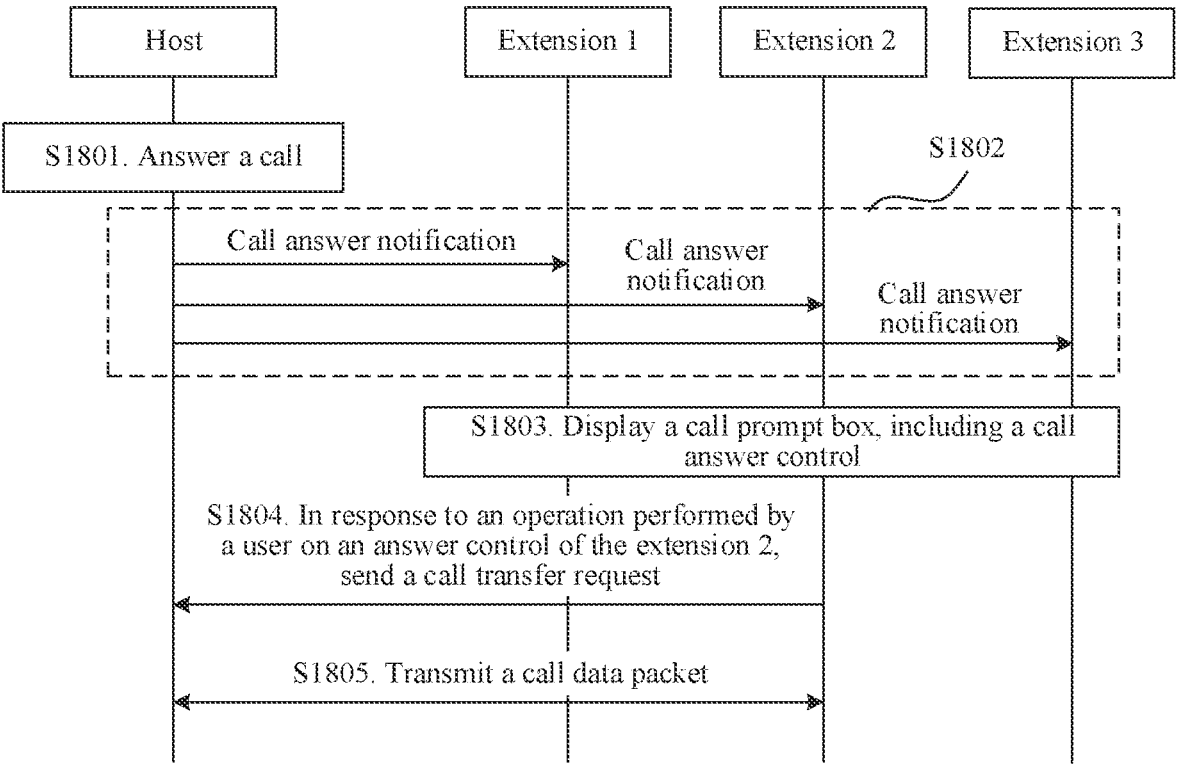
FIG. 18 is a flowchart of a call transfer method according to an embodiment of this application.

FIG. 18 is a flowchart of a call transfer method according to an embodiment of this application, and relates to a process in which a host answers an incoming call and the host performs an operation on an extension side to transfer a call of the host to an extension.

S1801, The host answers the call.

S1802. The host sends a call answer notification to each extension, to indicate that the current call is answered.

S1803. Each extension displays a call prompt box, where the call prompt box includes incoming call information, an answer control, and a cancellation control.

Figure 19:
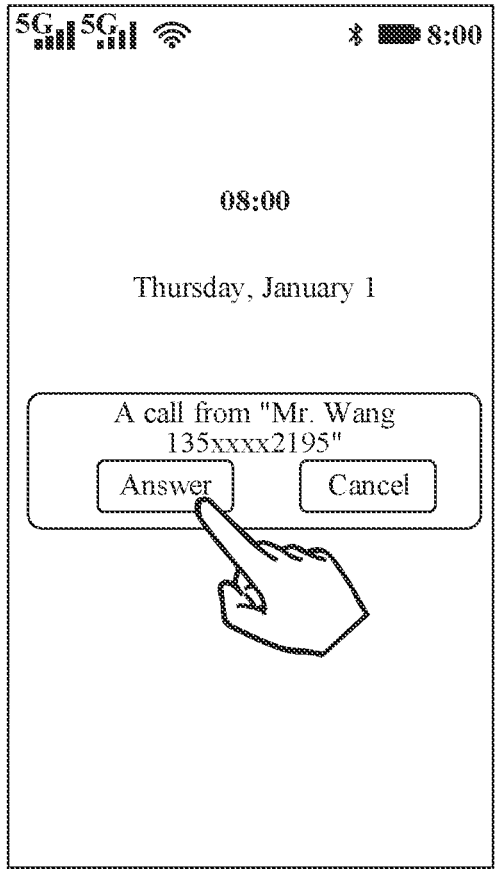
FIG. 19 is a schematic diagram of an interface of an electronic device according to another embodiment of this application.

For example, refer to FIG. 19. The call information in the call prompt box is "A call from Mr. Wang 135xxxx2195". The answer control is configured to transfer the call to this locality for processing, and the cancellation control is configured to cancel displaying the prompt box by a user. It should be noted that an operation of canceling displaying the prompt box by the user does not affect the call.

S1804. In response to an operation performed by the user on an answer control of an extension 2, the extension 2 sends a call transfer request to the host.

S1805. The host and the extension 2 transmit a call data packet.

According to the call transfer method provided in this embodiment of this application, in a process in which the host performs a call, the user may perform an operation on the extension side to transfer the call to the extension.

Figure 20:
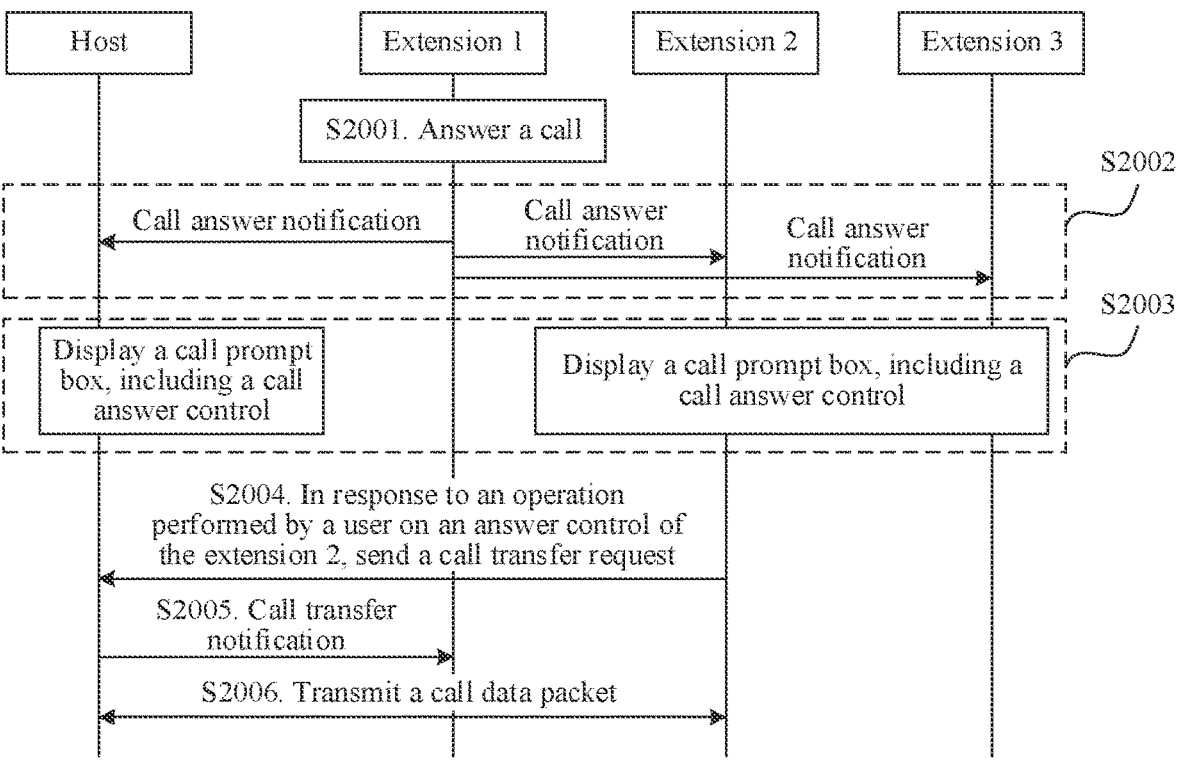
FIG. 20 is a flowchart of a call transfer method according to another embodiment of this application.

FIG. 20 is a flowchart of a call transfer method according to another embodiment of this application, and relates to a process in which an extension answers an incoming call and the call of the extension is transferred to another extension.

S2001 An extension 1 answers the call. After the extension 1 answers the call, the extension 1 transmits an uplink/downlink call data packet by using a host and a network side device.

S2002. The extension 1 sends a call answer notification to another electronic device in a device network, where the call answer notification indicates that the current call is answered. The another electronic device includes the host and the another extension, for example, an extension 2 and an extension 3.

S2003. The another electronic device in the device network displays a call prompt box, where the call prompt box includes incoming call information, an answer control, and a cancellation control. For the call prompt box, refer to FIG. 19. Details are not described herein in this embodiment.

S2004. In response to an operation performed by a user on an answer control of the extension 2, the extension 2 sends a call transfer request to the host.

S2005. The host sends a call transfer notification to the extension 1, where the call transfer notification is used to notify stopping using the extension 1 to perform the call and terminating data transmission with the extension 1.

S2006. The host and the extension 2 transmit a call data packet.

According to the call transfer method provided in this embodiment of this application, in a process in which the extension performs the call, the user may perform an operation on an extension side to transfer the call to the another extension.

(5) Dual-Link Call

Because one electronic device (for example, a mobile phone) generally has only one set of audio peripherals, in a process in which the electronic device answers a first call, if the electronic device answers a second call, the electronic device suspends collecting and playing a call data packet of the first call, and starts to collect and play a call data packet of the second call. That is, currently, a user cannot answer two incoming calls of a same electronic device at the same time, which may cause the user to miss or delay some important calls or conferences. In addition, during the second call, a peer device of the first call plays a call ring back tone, to notify a peer user that the first call is suspended, resulting in poor experience of the peer user.

Therefore, an embodiment of this application further provides a dual-link call method, which relates to a process of answering the second call by another electronic device, to simultaneously answer two calls of a same electronic device.

Figure 21:
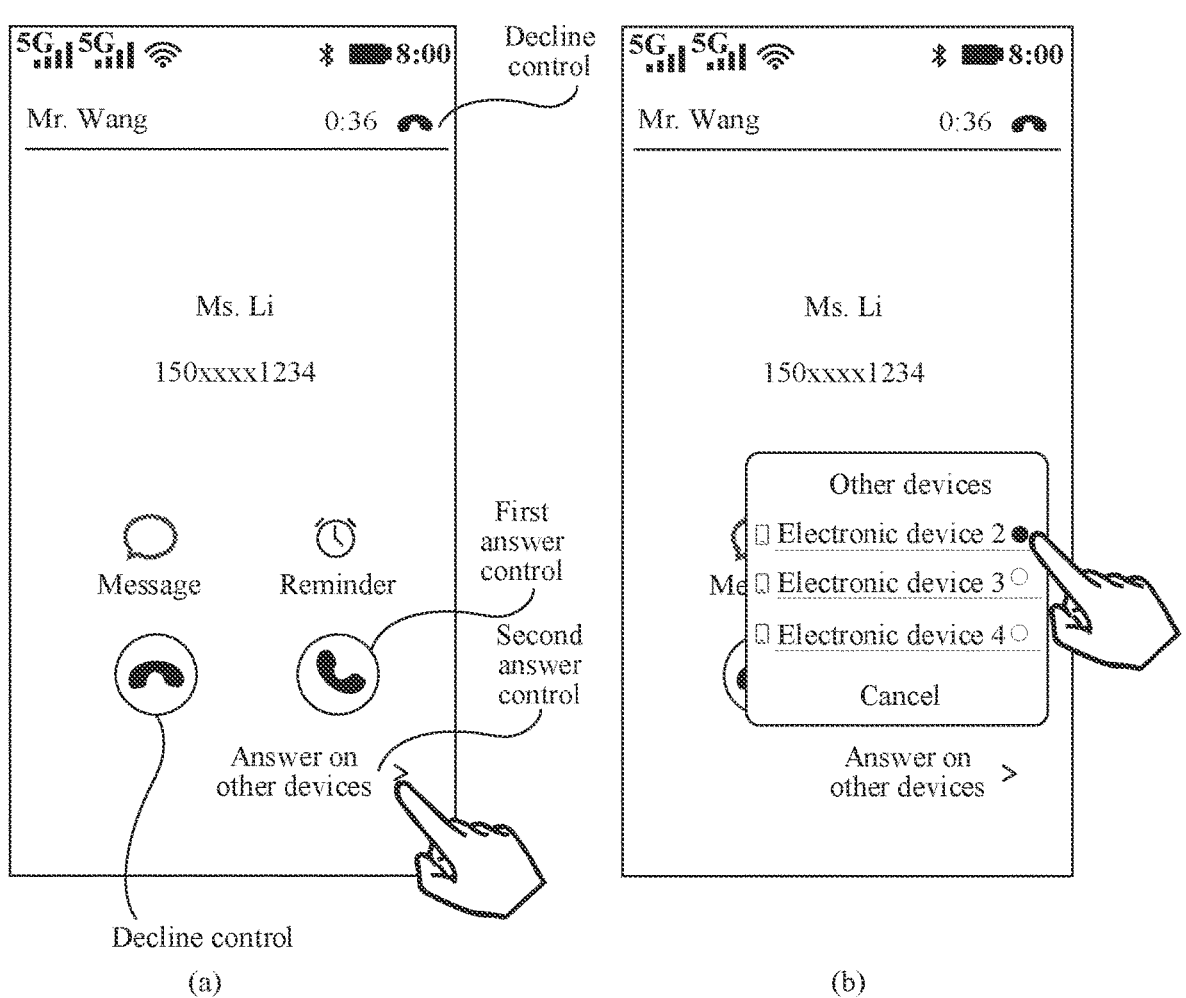
FIG. 21 is a schematic diagram of an interface of an electronic device according to another embodiment of this application.

Refer to (a) in FIG. 21. In a process of performing a first call (for example, a call from Mr. Wang), if a second call (for example, a call from Ms. Li) is incoming, an electronic device 1 rings and displays an incoming call interface of the second call when displaying incoming call information, call duration, and a decline control of the first call. The incoming call interface includes incoming call information, a decline control, a first answer control, and a second answer control of the second call. The decline control is configured to decline the current incoming call, the first answer control is configured to control the electronic device 1 to locally answer the call, and the second answer control is configured to select, by using the electronic device 1, another electronic device to answer the call.

Refer to (b) in FIG. 21. In response to an operation performed by the user on the second answer control, the electronic device 1 displays a device selection box, where the device selection box includes other electronic devices available in a device network, for example, an electronic device 2, an electronic device 3, and an electronic device 4. For example, in response to an operation of selecting the electronic device 2 by the user, the electronic device 1 transfers the second call to the electronic device 2 for processing. In a process in which the electronic device 2 answers the second call, the electronic device 2 processes the second call as an extension of the electronic device 1, to be specific, the electronic device 1 sends a downlink call data packet of the second call of the network side device to the electronic device 2 for playing, and sends an uplink call data packet collected by the electronic device 2 to the network side device.

Because many electronic devices support installation of two SIM cards, different SIM cards generally correspond to different phone numbers. Therefore, the first call and the second call of the electronic device may be calls of a same SIM card (namely, a single-card dual-link call), or may be calls of different SIM cards (namely, a dual-card dual-link call).

Figure 22:
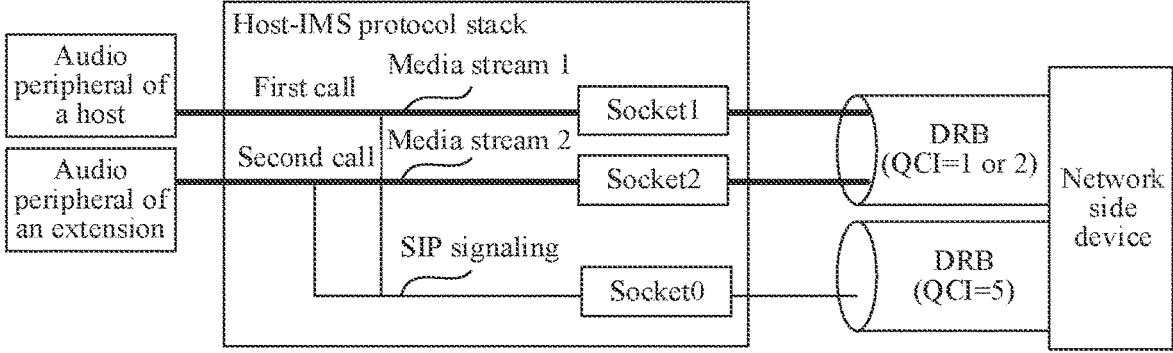
FIG. 22 is a schematic diagram of a single-card dual-link call according to an embodiment of this application.

In a single-card dual-link call process, refer to FIG. 22. A host establishes a first call and a second call with a same network side device by using an IMS protocol stack.

For the first call, the host is connected to the network side device by using the IMS protocol stack and by using Socket1 and Socket0, and a quality of service class identifier (Quality of Service Class Identifier, QCT) of a communication link corresponding to the Socket1 is equal to 1 or 2, and is used to transmit a media stream 1 of the first call. A QCI of a communication link corresponding to the Socket0 is 5, and is used to transmit session initiation protocol (session initiation protocol, SIP) signaling of the first call. The media stream 1 of the first call is collected or played by an audio peripheral of the host.

For the second call, the host is connected to the network side device by using the IMS protocol stack and by using Socket2 and the Socket0, and a QCI of a communication link corresponding to the Socket2 is 1 or 2, and is used to transmit a media stream 2 of the second call. The Socket0 is also used to transmit SIP signaling of the second call. The media stream 2 of the second call is collected or played by an audio peripheral of an extension.

It should be noted that, in a process of establishing each call, the host needs to establish a data radio bearer (Data Resource Bearer, DRB) with a base station, and determine a QCI value of the DRB. When QCI=1, the DRB carries audio data. When QCI=2, the DRB carries video data. The QCI corresponding to the Socket0 is 5 and carries SIP signaling data.

Figure 23:
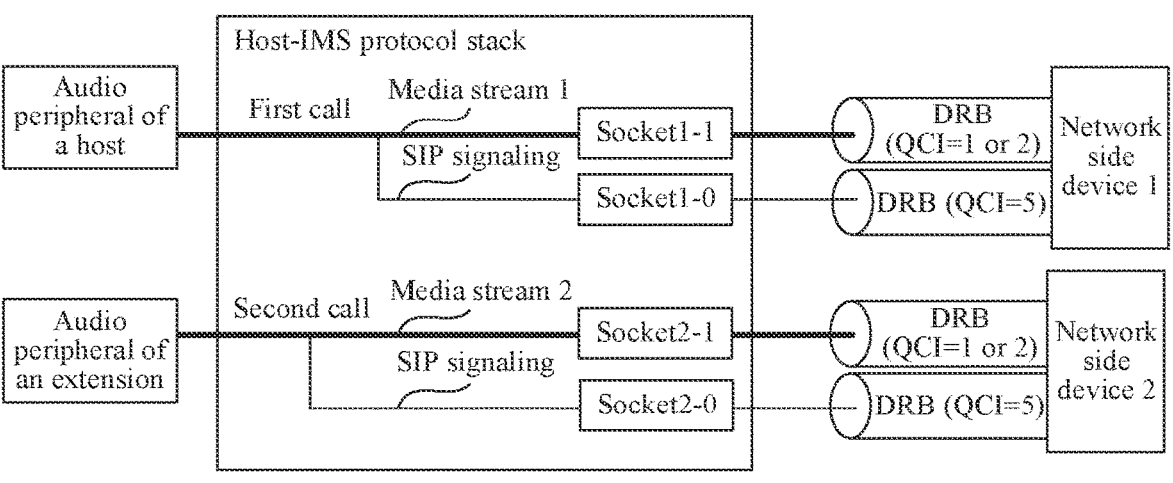
FIG. 23 is a schematic diagram of a dual-card dual-link call according to an embodiment of this application.

In a dual-card dual-link call process, for a scenario in which dual cards belong to different operators, refer to FIG. 23. A host establishes a first call with a network side device 1, and establishes a second call with a network side device 2 by using an IMS protocol stack.

For the first call, the host is connected to the network side device 1 by using the IMS protocol stack and by using Socket1-1 and Socket1-0, and a QCI of a communication link corresponding to the Socket1-1 is 1 or 2, and is used to transmit a media stream 1 of the first call. A QCI of a communication link corresponding to the Socket1-0 is 5, and is used to transmit SIP signaling of the first call. The media stream 1 of the first call is collected or played by an audio peripheral of the host.

For the second call, the host is connected to the network side device 2 by using the IMS protocol stack and by using Socket2-1 and Socket2-0, and a QCI of a communication link corresponding to the Socket2-1 is 1 or 2, and is used to transmit a media stream 2 of the second call. A QCI of a communication link corresponding to the Socket2-O is 5, and is used to transmit SIP signaling of the second call. The media stream 2 of the second call is collected or played by an audio peripheral of an extension.

The dual-link call method provided in this embodiment of this application is applicable to a scenario of a dual-link cellular call, and is applicable to a scenario in which an internet application service (over the top, OTT) call and a cellular call are concurrent. For example, in a process in which the electronic device makes a WeChat call or performs an internet conference, if the electronic device has an incoming cellular call, the electronic device 1 may also select, based on a user instruction, the extension to process the call. For a specific process, refer to the foregoing descriptions. Details are not described herein in this embodiment.

In conclusion, according to the call method provided in this embodiment of this application, in a process of performing the first call, the electronic device 1 may select, based on a user operation, the electronic device 2 to answer the second call, and process the two calls at the same time that the same electronic device receives. This avoids a case in a current technology of holding (Hold) the first call to answer the second call, and a peer end of the first call does not play a ring back tone, to have good user experience.

In addition, optionally, in a process in which the electronic device 1 performs the first call, if there is the incoming second call, the electronic device 1 may locally hold the first call, and switch the second call to the electronic device 2 for answering. For a method for locally holding the first call, refer to an existing solution of holding a call. For a specific process of switching the second call to the electronic device 2 for answering, refer to the foregoing descriptions. Details are not described herein again in this embodiment.

(6) Audio and Video Separation Processing

In a device network, some electronic devices support audio play but do not support video play (for example, a smart speaker); some electronic devices support video play but do not support audio play (for example, a projector); and some electronic devices support both audio play and video play, but a play effect is poor, for example, a video play screen is small or audio play quality is poor. Therefore, for a video call, to improve call experience of a user, this embodiment further provides a call method based on audio and video separation play.

Figure 24:
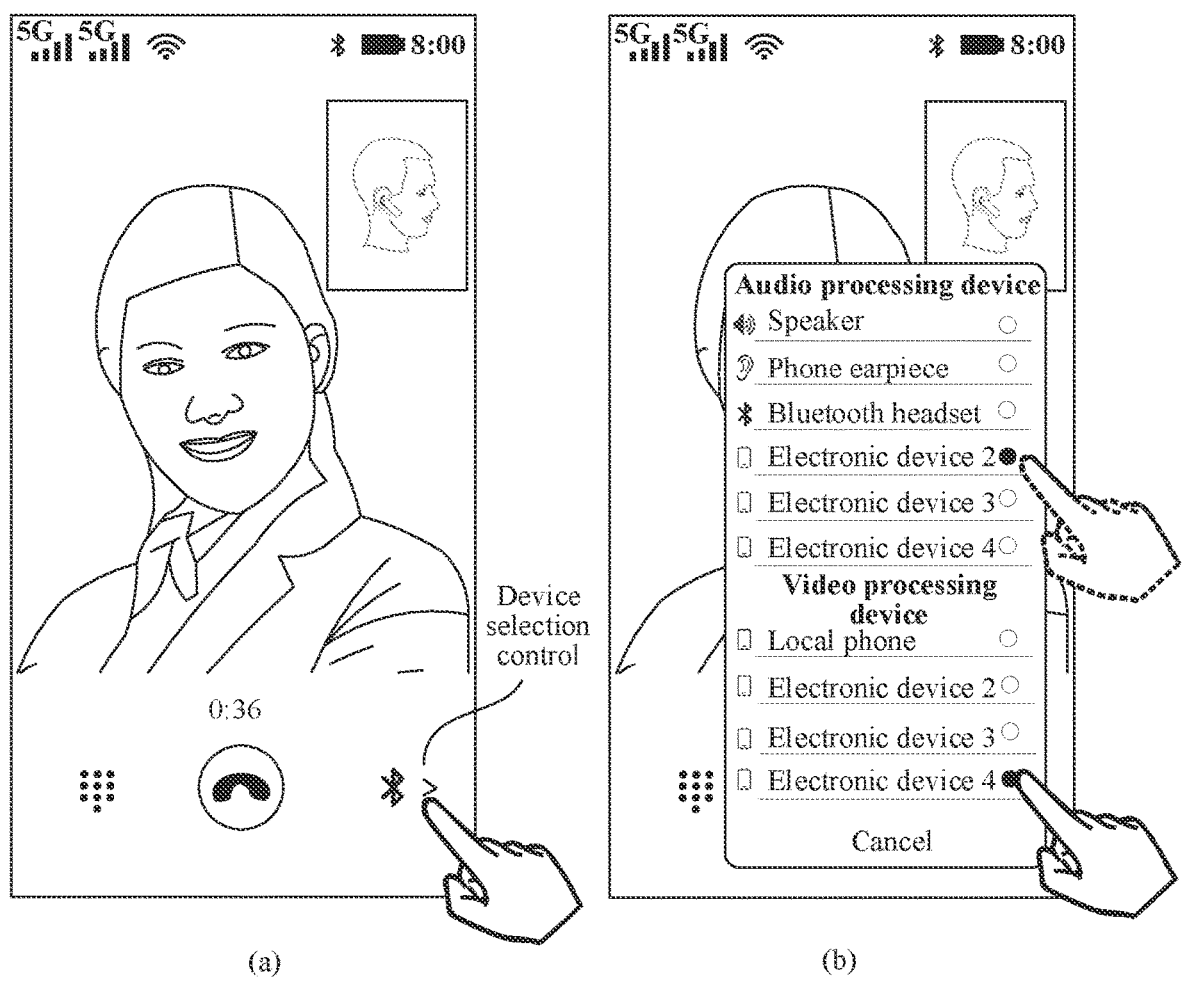
FIG. 24 is a schematic diagram of an interface of an electronic device according to still another embodiment of this application.

Refer to (a) in FIG. 24. A call interface of an electronic device 1 includes a device selection control, and the device selection control is configured to select an audio processing device and a video processing device of a current call. In response to an operation performed by a user on the device selection control, the electronic device may display a device selection box shown in (b) in FIG. 24, including the audio processing device and the video processing device that are available to the electronic device. For example, the audio processing device includes a speaker, an earpiece, a Bluetooth headset, an electronic device 2, an electronic device 3 an electronic device 4, and the like. The video processing device includes a local phone, the electronic device 2, the electronic device 3, the electronic device 4, and the like.

The user may select at least one audio play device and at least one video play device in the device selection box based on a requirement of the user. For example, the user may select the electronic device 2 as the audio processing device, and is configured to play downlink audio data of the current call and collect uplink audio data of the current call. In addition, the electronic device 4 is selected as the video processing device, and is configured to play downlink video data of the current call and collect uplink video data of the current call.

Figures 25A, 25B, 25C:
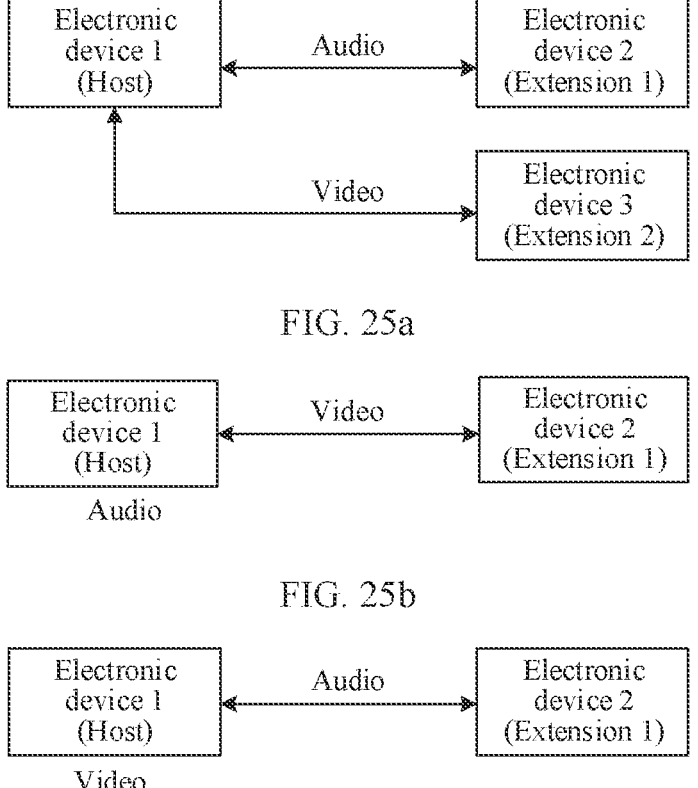
FIG. 25a is a schematic diagram of audio and video separation processing according to an embodiment of this application.
FIG. 25b is a schematic diagram of audio and video separation processing according to another embodiment of this application.
FIG. 25c is a schematic diagram of audio and video separation processing according to still another embodiment of this application.

There are a plurality of audio and video separation processing modes based on different user selections. For example, refer to FIG. 25*a*. In a call process of an electronic device 1 (a host), an electronic device 2 (namely, an extension 1) may process audio, and an electronic device 3 (namely, an extension 2) may process a video. For another example, refer to FIG. 25*b*. In the call process of the electronic device 1 (namely, the host) may locally process the audio, and the electronic device 2 (namely, the extension 1) processes the video. For another example, refer to FIG. 25*c*. In the call process, the electronic device 1 (namely, the host) may locally process the video and the electronic device 2 (namely, the extension 1) processes the audio.

According to the call method provided in this embodiment, in a process of performing a video call, the electronic device may separately process the audio and the video on the different electronic devices based on a requirement of the user, to have good user experience.

(7) Audio/Video Separation Collection and Play

For some electronic devices, a microphone fault, a loud-speaker fault, a camera fault, or the like may exist. As a result, in an audio or video call process, uplink audio data cannot be normally collected, downlink audio data cannot be played, or uplink video data cannot be normally collected, and a call cannot be normally performed. Therefore, an embodiment of this application further provides a call method based on audio/video separation collection and play.

Figure 26:
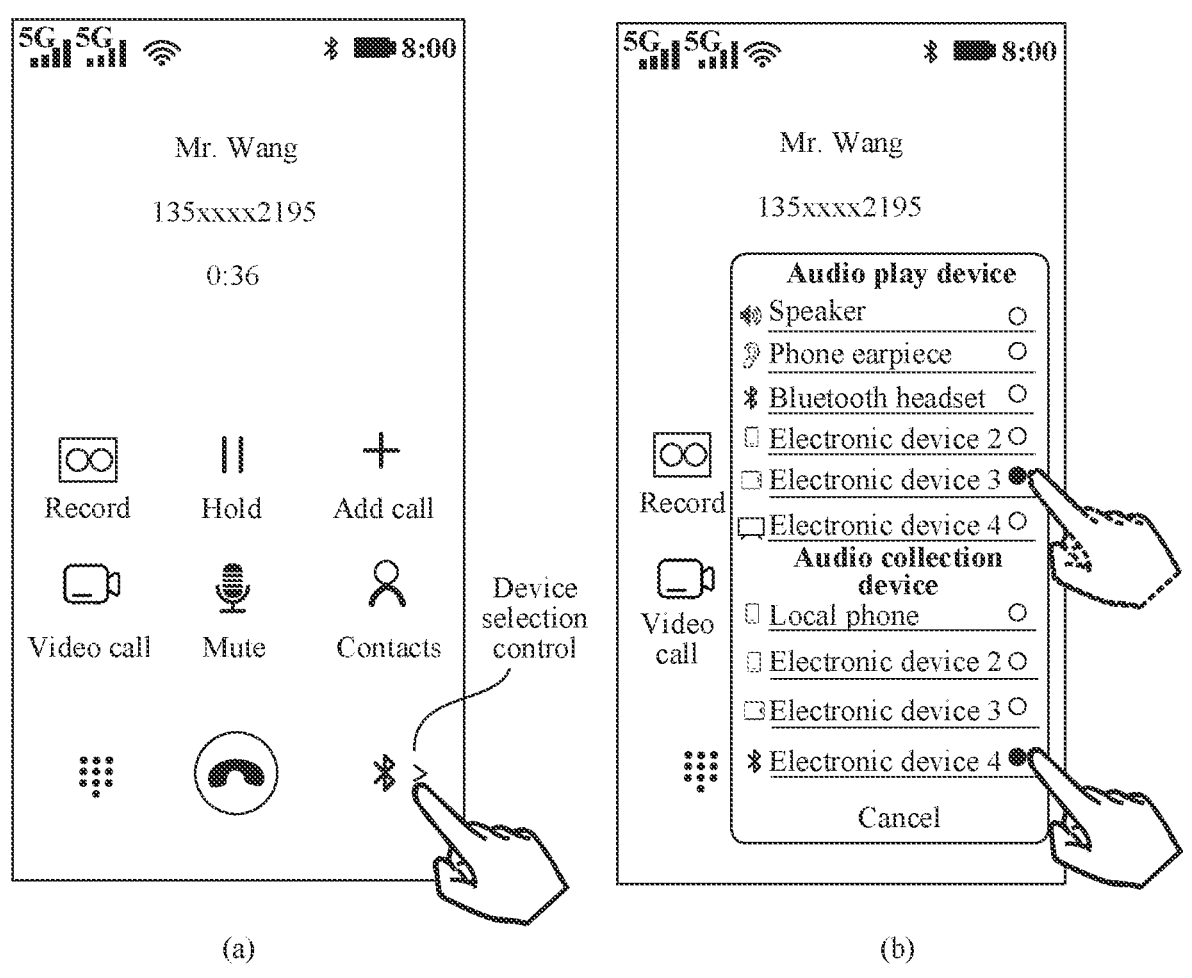
FIG. 26 is a schematic diagram of an interface of an electronic device according to another embodiment of this application.

An example in which an electronic device 1 separately collects and plays audio is used. Refer to (a) in FIG. 26, in response to an operation performed by a user on a device selection control in a call interface, the electronic device 1 displays a device selection box shown in (b) in FIG. 26. The device selection box includes an audio play device and an audio collection device that are available to the electronic device 1. For example, the audio play device may be a speaker of the local phone, a phone earpiece, a Bluetooth headset, an electronic device 2, an electronic device 3, an electronic device 4, and the like. The audio collection device may be the local phone, the electronic device 2, the electronic device 3, the electronic device 4, or the like.

Figure 27A:
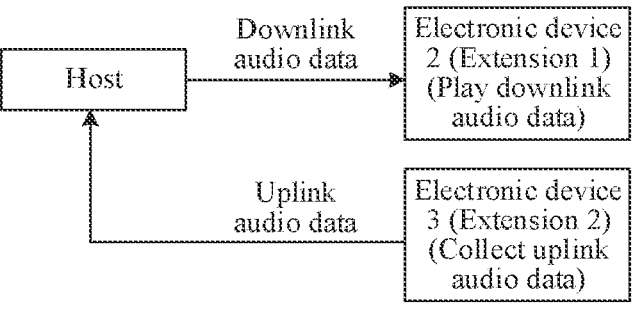
FIG. 27*a* is a schematic diagram of audio collection and play according to an embodiment of this application.

In some embodiments, refer to FIG. 27*a*. The user may select the electronic device 2 as the audio play device, to play downlink audio data. In addition, the electronic device 3 is selected as the audio collection device, to collect uplink audio data.

Figure 27B:
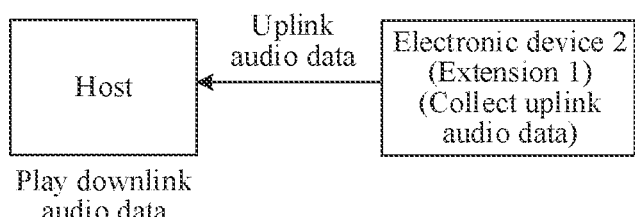
FIG. 27*b* is a schematic diagram of audio collection and play according to another embodiment of this application.

In some other embodiments, refer to FIG. 27*b*. The user may select the local phone as the audio play device, to play the downlink audio data. In addition, the electronic device 2 is selected as the audio collection device, to collect the uplink audio data.

Figure 27C:
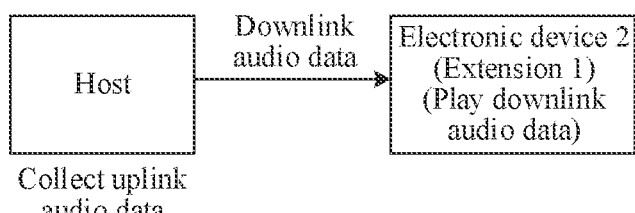
FIG. 27*c* is a schematic diagram of audio collection and play according to still another embodiment of this application.

In some other embodiments, refer to FIG. 27*c*. The user may select the local phone as the audio collection device, to collect the uplink audio data. In addition, the electronic device 2 is selected as the audio play device, to collect the downlink audio data.

In addition, the electronic device may further separately collect and play a video. For a specific process, refer to the foregoing process of separately collecting and playing the audio. Details are not described herein in this embodiment.

According to the call method based on audio/video separation collection and play provided in this embodiment of this application, when an audio/video processing apparatus (such as a microphone, a loudspeaker, or a camera) is faulty, the electronic device may select, based on a user instruction, another electronic device to separately process a processing task of the faulty processing apparatus, to ensure normal running of the call.

Figure 28:
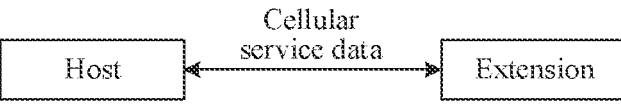
FIG. 28 is a schematic diagram of transfer/duplication of an overall communication capability of a host to an extension according to an embodiment of this application.

(8) Duplication/Transfer of an Overall Cellular Communication Service of a Host to an Extension In this embodiment, refer to FIG. 28. The host may duplicate or transfer the overall cellular communication service to the extension for processing, for example, a cellular call service, a cellular message, and a web page search service. After the host duplicates the cellular communication service to the extension for processing, the cellular communication service may be processed on both a host side and an extension side. After the host transfers the cellular communication service to the extension for processing, after receiving cellular service data, the host transparently transmits the cellular service data to the extension for processing.

In this embodiment, in a device network, after a call ends, a call record may be displayed on the host, the call record may be displayed on the host and the extension that answers the call, or the call record may be displayed on all extensions in the host and the device network. Optionally, the host may provide a setting option about call record sharing, so that the user selects a manner of sharing the call record.

The call record generally includes incoming call time, an incoming call number, a home location of the incoming call number, a call status, and the like. The call status includes a missed call, a declined call, an answered call, call duration, and the like. Optionally, after determining the call record, the host may store the call record and share the call record with the extension, so that the user views the call record on the extension. The extension may be the extension that answers the call, or may be one or more other extensions in the device network. Alternatively, the extension may generate the call record by itself.

For the host, if a phone number is stored in the host, when the call record is displayed, the phone number is displayed as a corresponding contact name, to facilitate identification by the user. However, the phone number is generally not stored on the extension side. To enable the extension to display the call record in a form that facilitates the identification of the user, the host may send contact information of the current call to the extension each time the call is made, so that the extension displays a name, or an image corresponding to the call number during the call, and displays the call record based on the contact information after the call ends. Alternatively, the host may share all locally pre-stored contact information with each electronic device in the device network. Based on this, when displaying the call record, the extension may display the phone number as the contact name, so that the user can identify a contact corresponding to the call record.

It should be understood that sequence numbers of the steps do not mean an execution sequence in embodiments. The execution sequence of each process needs to be determined based on functions and internal logic of the processes, and should not constitute any limitation on the implementation processes of embodiments of this application.

An embodiment of this application further provides a call system. The system includes a host and an extension. A network side device and the host are connected through a network side link, and the host and the extension are connected through a terminal side link. The host is configured to perform the method performed by the host in the foregoing embodiments, and the extension is configured to perform the method performed by the extension in the foregoing embodiments.

An embodiment of this application further provides a host. The host and a network side device are connected through a network side link, and the host and an extension are connected through a terminal side link. The host is configured to perform the methods performed by the host in the foregoing embodiments.

An embodiment of this application further provides an extension. The extension and a host are connected through a terminal side link, the host and a network side device are connected through a network side link. The extension is configured to perform the method performed by the extension in the foregoing embodiments.

This embodiment provides a computer program product. The program product includes a program. When the program is run by an electronic device, the electronic device is enabled to implement the method performed by the host in the embodiment.

This embodiment provides a computer program product, where the program product includes a program. When the program is run by an electronic device, the electronic device is enabled to implement the method performed by the extension in the embodiment.

An embodiment of this application provides a computer-readable storage medium. The computer-readable storage medium stores a computer program. When the computer program is executed by a processor, the method performed by the host in the foregoing embodiments is implemented.

An embodiment of this application provides a computer-readable storage medium, where the computer-readable storage medium stores a computer program. When the computer program is executed by a processor, the method performed by the extension in the foregoing embodiments is implemented.

An embodiment of this application provides a chip, used in a host. The host and a network side device are connected through a network side link, and the host and an extension are connected through a terminal side link. The chip includes a memory and a processor. The processor executes a computer program stored in the memory, to control the method performed by the host in the foregoing embodiments.

An embodiment of this application provides a chip, used in an extension. The extension and a host are connected through a terminal side link, and the host and a network side device are connected through a network side link. The chip includes a memory and a processor, and the processor executes a computer program stored in the memory, to control the method performed by the extension in the foregoing embodiments.

It should be understood that, the processor mentioned in embodiments of this application may be a central processing unit (central processing unit, CPU), and may further be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor.

It may be understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RANs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAMI).

It may be clearly understood by a person skilled in the art that, for the purpose of convenient and brief description, for a specific working process of the foregoing system, apparatus, and unit, refer to a corresponding process in the foregoing method embodiments. Details are not described herein again.

In descriptions of embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

Reference to "an embodiment", "some embodiments", or the like described in the specification of this application indicates that one or more embodiments of this application include a specific feature, structure, or characteristic described with reference to embodiments. Therefore, the statements "in one embodiment", "in some embodiments", "in some other embodiments", "in some other embodiments", and the like that appear in the differences in this specification do not necessarily refer to the same embodiment, but mean "one or more but not all embodiments", unless otherwise specially emphasized. The terms "include", "include", "have", and their variants all mean "include but are not limited to" unless otherwise specifically emphasized.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An extension, wherein the extension and a host are connected through a first terminal side link, the host and a network side device are connected through a network side link, and the extension exchanges a call data packet with the network side device through the first terminal side link and the network side link; and
wherein the extension is configured to:
transmit the call data packet with the host through a second terminal side link in response to determining that call quality of the extension is lower than a quality threshold, wherein the first terminal side link is different from the second terminal side link.

2. The extension according to claim 1, wherein:
the second terminal side link is a communication link pre-established by the host and the extension; or
the second terminal side link is a communication link newly established by the host and the extension in response to determining that the call quality of the extension is lower than the quality threshold.

3. The extension according to claim 1, wherein the transmitting the call data packet with the host through a second terminal side link in response to determining that call quality of the extension is lower than a quality threshold comprises:
the extension and the host jointly transmit the call data packet through the first terminal side link and the second terminal side link in response to determining that the call quality of the extension is lower than the quality threshold.

4. The extension according to claim 1, wherein the first terminal side link or the second terminal side link is one of the following: a Bluetooth link, a wireless fidelity (Wi-Fi) link, or a data service link.

5. The extension according to claim 1, wherein the extension is further configured to:

in response to determining that the call quality of the extension is lower than the quality threshold, display prompt information, wherein the prompt information prompts a user to control the extension to approach the host.

6. The extension according to claim 3, wherein the extension is further configured to:

detect first call quality of the first terminal side link and second call quality of the second terminal side link; and disconnect the second terminal side link in response to determining that the first call quality is higher than the quality threshold; or disconnect the first terminal side link in response to determining that the second call quality is higher than the quality threshold.

7. The extension according to claim 1, wherein the extension is further configured to:

in response to determining that the call quality of the extension is lower than the quality threshold, lower a coding standard of at least one of an uplink audio or an uplink video in the call data packet.

8. The extension according to claim 7, wherein the coding standard comprises at least one of a coding rate, a coding format, a sampling rate, resolution, and a frame rate.

9. The extension according to claim 1, wherein the extension and the host are located in a same device network, and electronic devices in the same device network can communicate with each other.

10. The extension according to claim 9, wherein the extension is further configured to:

in response to receiving both a first incoming call notification sent by the host and a second incoming call notification sent by the network side device for a same number, ignore either of the first incoming call notification and the second incoming call notification.

11. The extension according to claim 9, wherein the extension is further configured to:

display a first answer control and a second answer control in response to identifying a second incoming call in a process of locally processing a first call, wherein the first answer control is configured to locally answer the second incoming call, and the second answer control is configured to answer the second incoming call on another electronic device in the same device network; and control, in response to an operation performed by a user on the second answer control, the other electronic device to answer the second incoming call.

12. The extension according to claim 9, wherein the extension is further configured to:

send a downlink video to a first electronic device in the same device network, and receive an uplink video collected by the first electronic device; and send a downlink audio to a second electronic device in the same device network, and receive an uplink audio collected by the second electronic device, wherein:

the first electronic device is different from the second electronic device.

13. The extension according to claim 9, wherein the extension is further configured to:

control a first electronic device in the same device network to play at least one of a downlink audio or a downlink video, and receive at least one of an uplink audio or an uplink video collected by a second electronic device, wherein:

the first electronic device is different from the second electronic device.

14. A host, wherein a network side device and the host are connected through a network side link, the host and an extension are connected through a first terminal side link, and the extension exchanges a call data packet with the network side device through the first terminal side link and the network side link; and wherein the host is configured to:

transmit the call data packet with the extension through a second terminal side link in response to determining that call quality of the extension is lower than a quality threshold, wherein the first terminal side link is different from the second terminal side link.

15. The host according to claim 14, wherein the second terminal side link is a communication link pre-established by the host and the extension; or the second terminal side link is a communication link newly established by the host and the extension in response determining to that the call quality of the extension is lower than the quality threshold.

16. The host according to claim 14, wherein the host is further configured to:

jointly transmit the call data packet with the extension through the first terminal side link and the second terminal side link in response determining to that the call quality of the extension is lower than the quality threshold.

17. The host according to claim 14, wherein the first terminal side link or the second terminal side link is one of the following: a Bluetooth link, a wireless fidelity (Wi-Fi) link, or a data service link.

18. The host according to claim 14, wherein the host is further configured to perform at least one of the following: in response to determining that the call quality of the extension is lower than the quality threshold, lowering a coding standard of at least one of a downlink audio or a downlink video in the call data packet; or sending a coding standard change request to the network side device, to request the network side device to lower a coding standard of the at least one of the downlink audio or the downlink video in the call data packet.

19. The host according to claim 18, wherein the coding standard comprises at least one of a coding rate, a coding format, a sampling rate, resolution, and a frame rate.

20. The host according to claim 14, wherein the extension and the host are located in a same device network to communicate with each other.

* * * * *